United States Patent [19]

Yamamoto et al.

[11] Patent Number: 5,053,867
[45] Date of Patent: * Oct. 1, 1991

[54] DIGITAL COLOR IMAGE PROCESSING APPARATUS

[75] Inventors: Hiroyuki Yamamoto, Yokohama; Takashi Hasebe, Hachioji; Masahiko Matsunawa, Fussa; Hiroshi Katoh, Hachioji; Yoshinori Abe, Hino; Tetsuo Kimoto, Hachioji, all of Japan

[73] Assignee: Konica Corporation, Tokyo, Japan

[*] Notice: The portion of the term of this patent subsequent to Jun. 20, 2006 has been disclaimed.

[21] Appl. No.: 282,539

[22] Filed: Dec. 12, 1988

[30] Foreign Application Priority Data

Dec. 14, 1987 [JP] Japan .................. 62-315765

[51] Int. Cl.⁵ .................. H04N 1/46; G03F 3/8
[52] U.S. Cl. .................. 358/80; 358/75
[58] Field of Search .................. 358/75, 80, 10, 76, 358/77, 78

[56] References Cited

U.S. PATENT DOCUMENTS

| | | | |
|---|---|---|---|
| 4,841,361 | 6/1989 | Matsurawa et al. | 358/75 |
| 4,841,362 | 6/1989 | Urabe et al. | 358/75 |
| 4,878,110 | 10/1989 | Haruyama et al. | 358/80 |
| 4,908,701 | 3/1990 | Undagawa | 358/75 |
| 4,980,760 | 12/1990 | Hiratsuka et al. | 358/80 |

FOREIGN PATENT DOCUMENTS 5714734 6/1980 Japan .
5862769 10/1981 Japan .

Primary Examiner—Howard W. Britton
Assistant Examiner—Michael H. Lee
Attorney, Agent, or Firm—Finnegan, Henderson, Farabow, Garrett, and Dunner

[57] ABSTRACT

Disclosed is an image processing apparatus for processing digital color image data, wherein there are provided an image input circuit for introducing color image signal into a conversion circuit which generates digital color image data including color data and density data, a data processing circuit which includes a plurality of image processing circuits for processing the color data and the density data, and wherein latch circuits are further provided to each of the plurality of image processing circuits so that the color code data and the density data are respectively latched every after passing through the plurality of image circuit.

3 Claims, 22 Drawing Sheets

FIG. 7
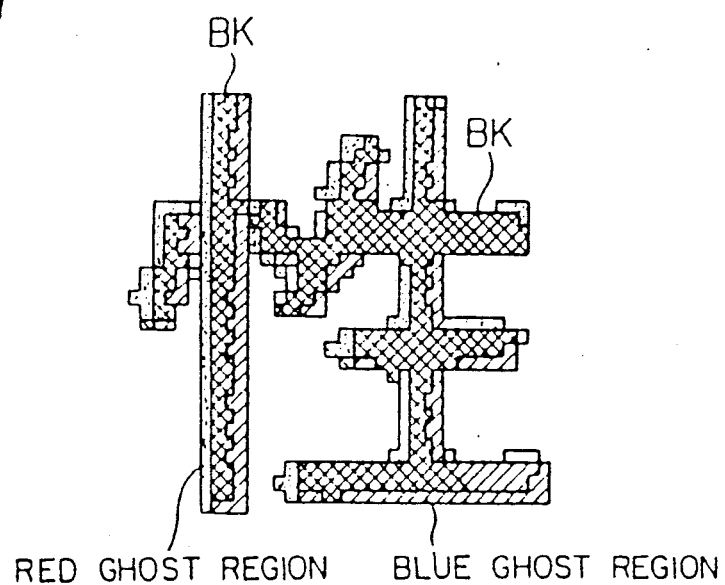
RED GHOST REGION    BLUE GHOST REGION
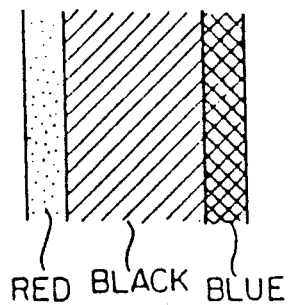
FIG.8A
RED  BLACK  BLUE
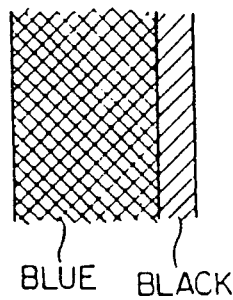
FIG.8B
BLUE  BLACK
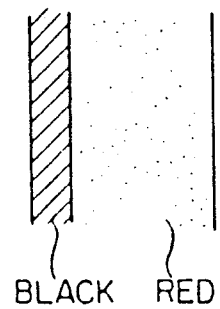
FIG.8C
BLACK  RED

FIG. 9

| NO. | COLOR PATTERN | TARGET PIXEL CHANGE |
|---|---|---|
| 1 | WHITE WHITE BLUE BLUE BLACK BLACK BLACK | BLUE → BLACK |
| 2 | WHITE WHITE BLUE BLUE BLUE WHITE WHITE | BLUE → BLUE |
| 3 | WHITE WHITE WHITE RED BLACK BLACK BLACK | RED → BLACK |
| 4 | WHITE WHITE RED RED RED WHITE WHITE | RED → RED |

PERIPHERAL PIXELS / PERIPHERAL PIXELS
TARGET PIXEL

FIG. 10

| N | M | NUMBER OF COLOR PATTERNS | PATTERN SIZE |
|---|---|---|---|
| 2 (WHITE BLACK) | 3 | 8 | 1 × 3 |
| | 5 | 32 | 1 × 5 |
| | 7 | 128 | 1 × 7 |
| 3 (WHITE BLACK RED) | 3 | 27 | 1 × 3 |
| | 5 | 243 | 1 × 5 |
| | 7 | 2187 | 1 × 7 |
| 4 (WHITE BLACK RED BLUE) | 3 | 64 | 1 × 3 |
| | 5 | 1024 | 1 × 5 |
| | 7 | 16384 | 1 × 7 |
| | 9 | 262144 | 3 × 3, 1 × 9 |

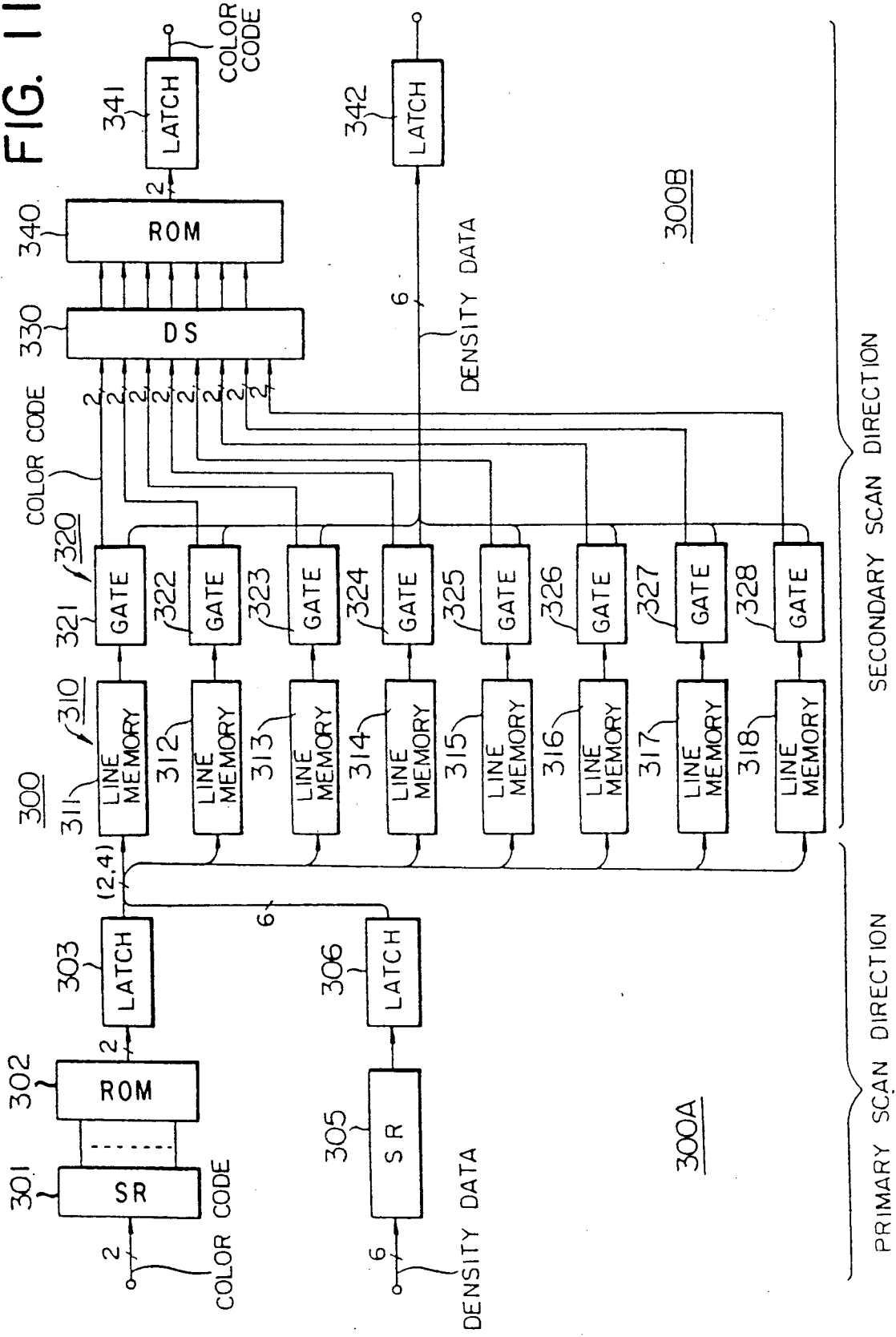

BLUE MARKER

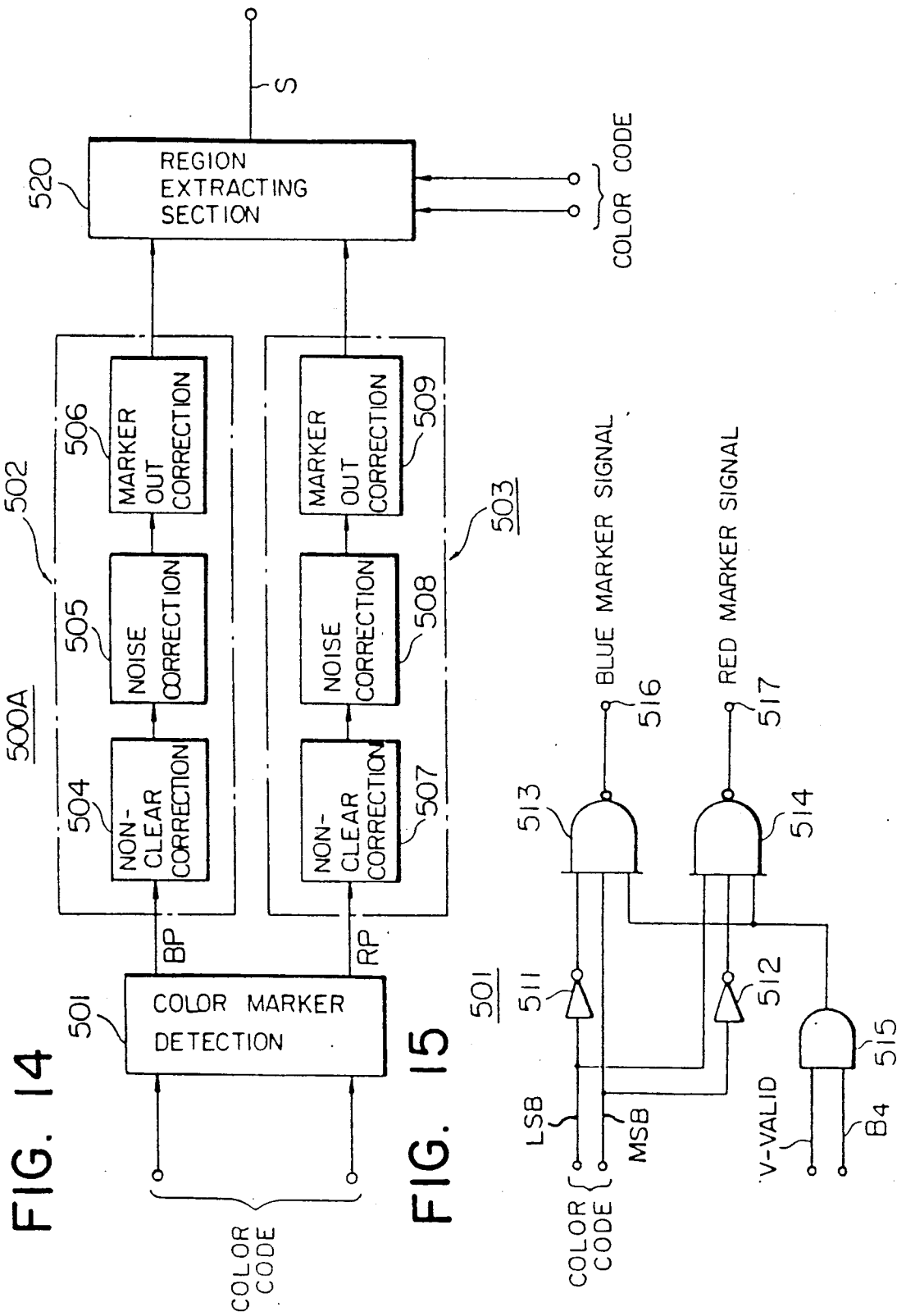

RED MARKER
BLUE MARKER
I II III IV V

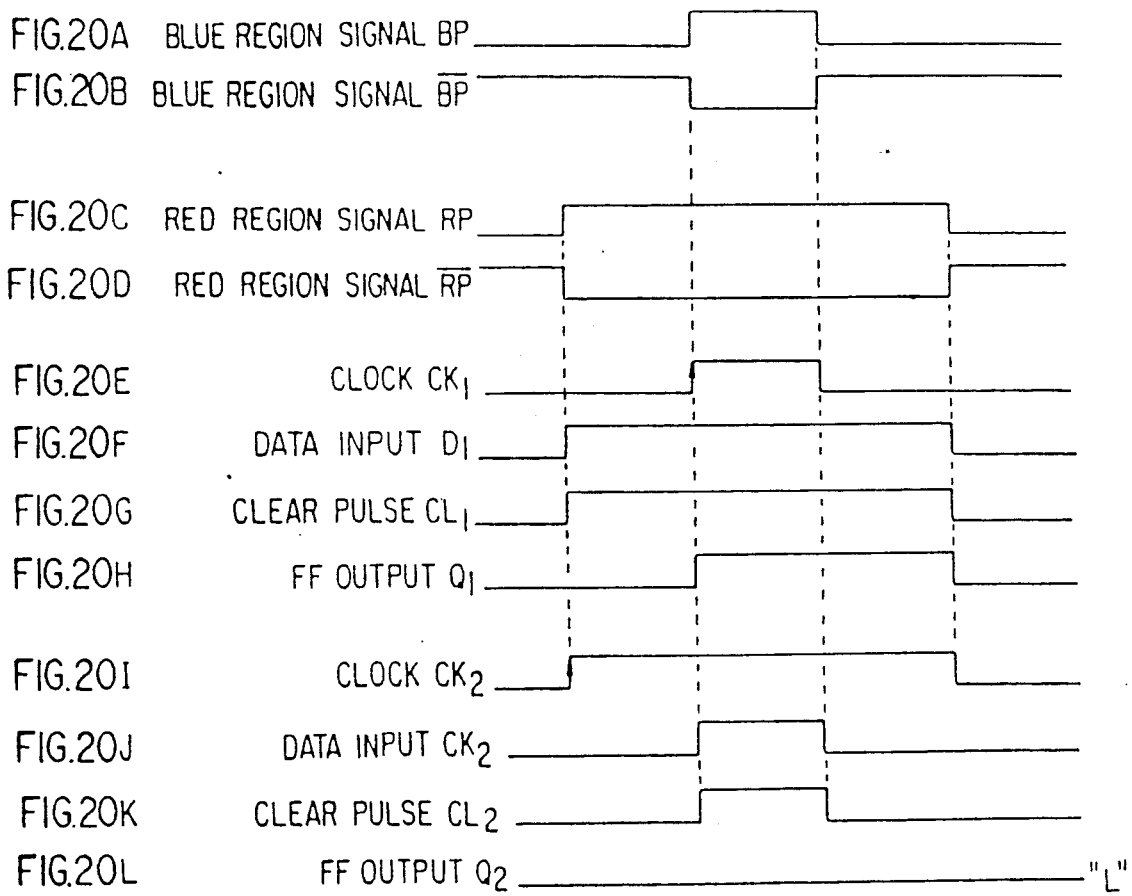

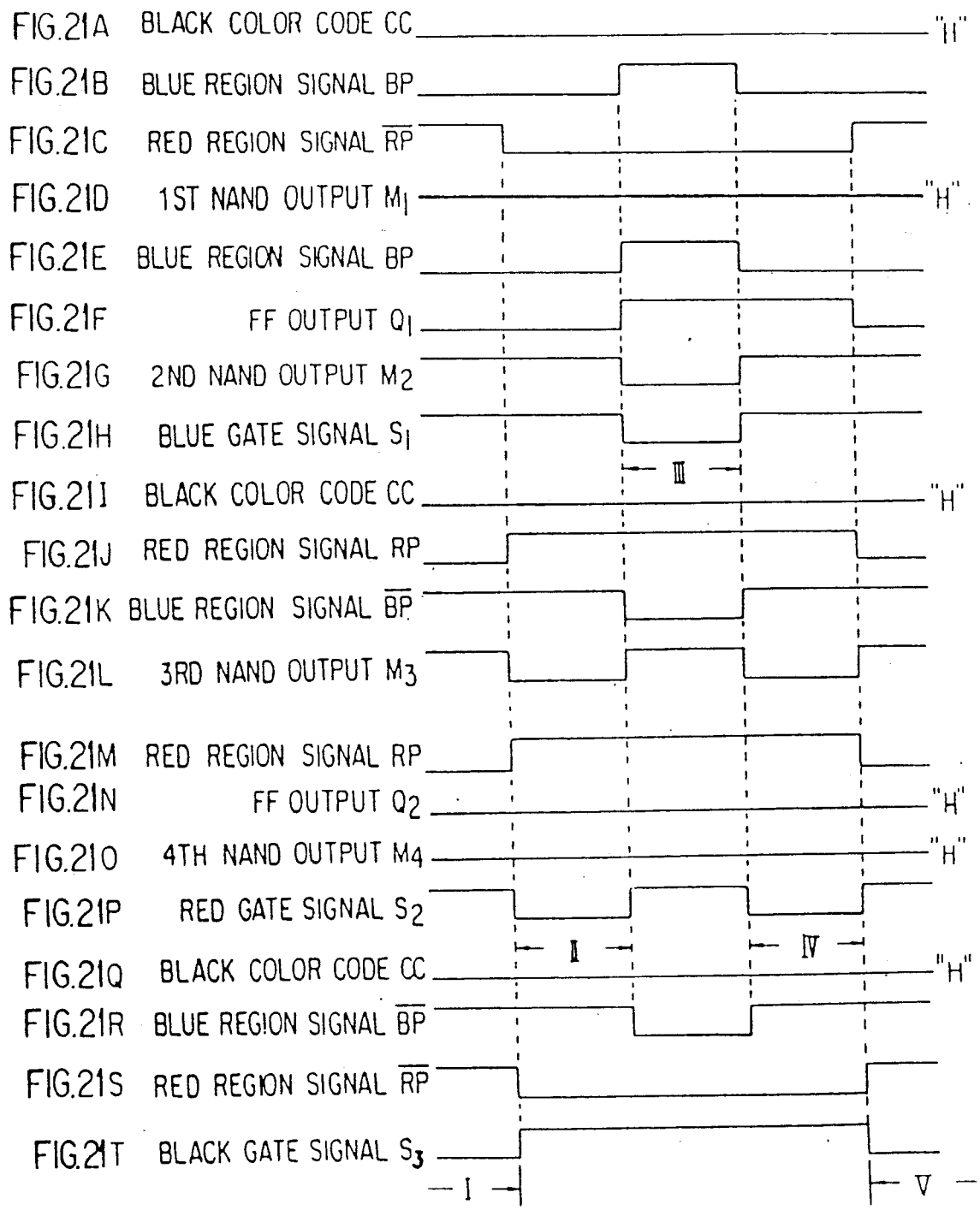

TO BE PAINTED BY
BLUE MARKER

DIGITAL COLOR IMAGE PROCESSING APPARATUS

BACKGROUND OF THE INVENTION

This invention generally relates to a color image processing apparatus with image processing functions including resolution correction and color ghost correction, and specially relates to a color image processing apparatus applied to a simple electrophotographic color copying machine in order to obtain satisfactory color image.

The color image processing apparatus optically reads color image information on a document optically, separates the information into multiple colors including black, red and blue, and outputs it through its electrophotographic color copying machine. This type of color image processing apparatus is disclosed in Japanese Patent Publication Open to Public Inspection Nos. 147374/82 and 62769/83.

FIG. 30 shows part of a key assembly of the said color image processing apparatus.

In this figure, color image information is separated into white and cyan colors, each of which is projected onto image sensors 104 and 105 for electrophotographic conversion.

More specifically, white and cyan color signals are supplied to the subtracter 2 where red color is separated. These white, cyan and red colors are gain-controlled by the AGC circuits 3, 4 and 5, respectively, the image processing such as the gamma-correction, etc. are processed by the image processing circuit 10 and then are coded by the binary coding circuits 6, 7 and 8, respectively. The coded output is again converted into red and black color signals by the arithmetic circuit 9, for example, and these signals are supplied to the color copying machine as image signals for color reproduction of the original.

FIG. 31 shows a reversed example of image processing and binary processing.

Incidentally, as kinds of image processing capable of being performed in such color image processing apparatus, color ghost correction, image resolution correction, and image size enlarging/reducing operation may be listed up. Accordingly, in the case where abovementioned processes are carried out, for the purpose of preventing relative interferences in signal processing among these processes and eliminating influences caused by noises, it may be necessary to latch respective signal in the time when respective signal processing is completed. In conventional devices as shown by FIGS. 30 and 31, each of plural color signals obtained by color separation must be independently subjected to a signal processing and a latch treatment. Correspondingly, there is a disadvantage that the circuitry size of image processing circuit 10 inevitably becomes larger. In addition to this disadvantage, in the conventional example as shown by FIG. 30, since a kind of signal to be processed is analog signal, there is a problem that it may be difficult to carry out various kinds of image processing. In the conventional example as shown, by FIG. 31, since a kind of signal to be processed in image processing circuit 10 is binary signal, there is a problem that possible image processing may be limited to enlarging/reducing process.

SUMMARY OF THE INVENTION

This invention proposes a color image processing apparatus that provides answers to these problems by reducing circuit scale while allowing easier color image processing.

For the purpose of solving abovementioned problems, the present invention is characterized by comprising a conversion means for separating a color image information into a plurality of color separation images and converting them into a plurality of color signals, a color separation means for further separating these color signals into digital color signals constituted by plural bits, an image processing means for applying various kinds of image processing onto the digital color signal, and a latch means provided to each group of the various kinds of image processing.

According to the invention, there may be various kinds of image processing such as image resolution correction, partial color conversion process, color ghost process and so on for the purpose of making a copied color image to be in high quality and realizing image processing responsible to user's desire, these various kinds of image processing are carried out after color separation process and before performing multi value coding process such as binary coding.

Color signal after color separation process is separated into color code representing it's color and density data.

The color signal is latched after the color separation process, thereafter color ghost process is carried out. After the color ghost process, the signal is further latched. Image resolution correction is carried out after the color ghost correction, thereafter latch process is carried out.

As shown above, every kinds of image processing are not applied onto every colors, but are applied onto density data or color code data which are obtained by color separation process, thereby the circuitry size is greatly reduced.

Since latch process is applied on these image processing means, the size of latch means is also reduced.

From these reasons, without increasing the circuitry size, image processing can be carried out under presence of sufficient processing information.

BRIEF DESCRIPTION OF THE DRAWINGS

Both

FIGS. 7 and 8 are descriptive illustrations for color ghost.

FIGS. 9 and 10 present descriptive drawing for color ghost correction.

FIG. 11 is a color ghost correction means diagram.

FIGS. 14, 15 and 16 show block diagrams for the region extracting circuit, marker detecting circuit, and region extracting assembly, respectively.

FIGS. 19 to 21 and 23 are all present illustrations that explain the region determining circuit.

DETAILED DESCRIPTION OF THE INVENTION

An example of the color image processing apparatus related to the invention is explained, using these figures.

Figure 1:
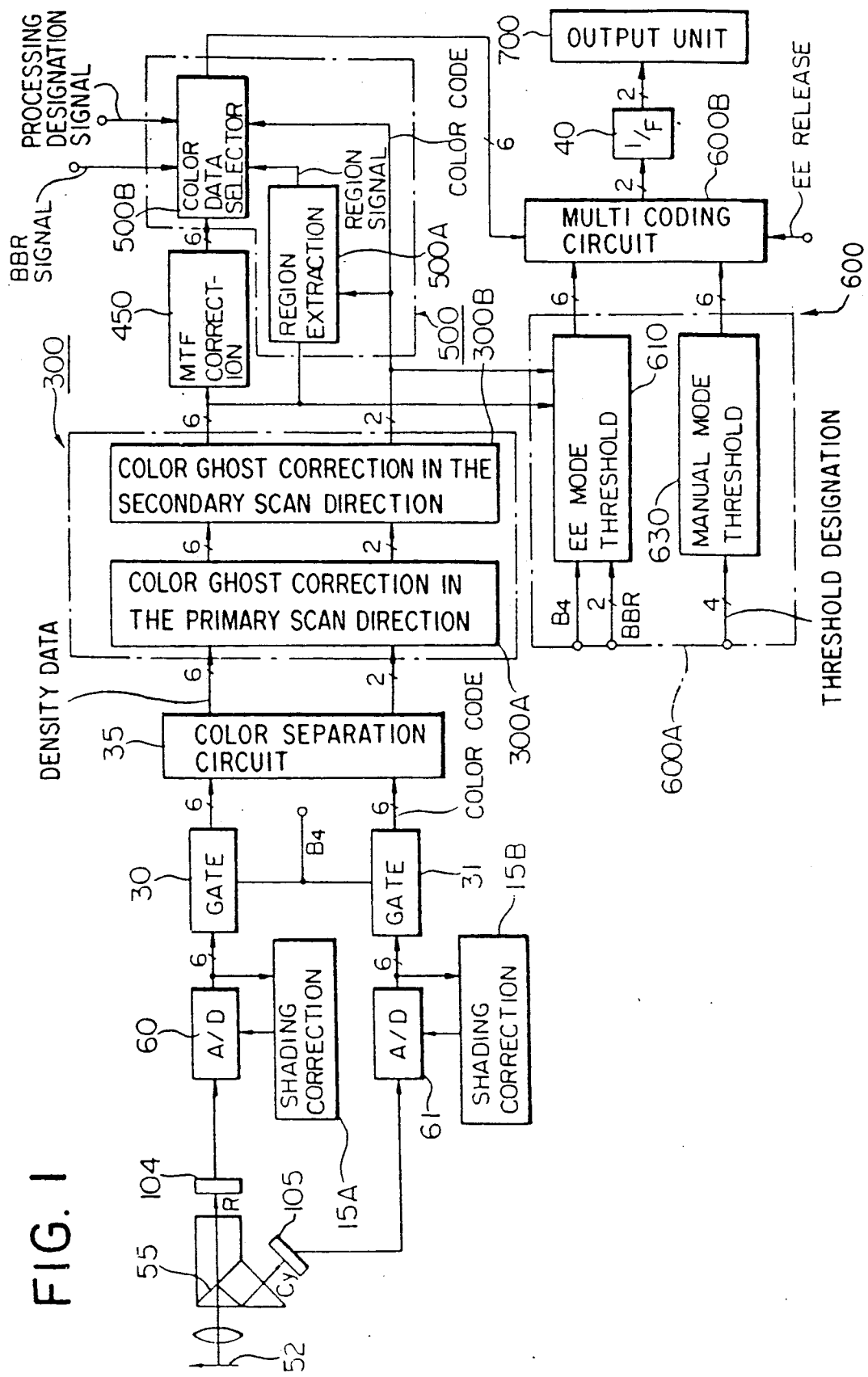
FIG. 1 shows a block diagram of the overall digital color image processing apparatus applicable to the invention which is used for the brief description.

The configuration of the color image processing apparatus is presented in FIG. 1.

The color image information (optical image) on the document 52 is separated into two color separation images by the dichroic mirror 55. In this example, color image information is separated into red R and cyan Cy color separation images. This color separation is conducted by use of a cutoff of the dichroic mirror 55 of 540 to 600mm. This enables the red component to form a transmitted light, and the cyan component to form reflected light. (It will be clear to say that the property of the transmittance may be reversible.)

Red R and cyan Cy color separation images are supplied to such image reading units as CCDs 104 and 105 through which image signals of red component R and cyan component Cy only are provided.

Image signals R and Cy are supplied to analog/digital converters 60 and 61 where they are converted into digital signals with the predetermined bits, 6 bits in this example. At the time, shading correction is conducted. 15A and 15B show a part of shading correcting circuits. A detailed description of correction is given later.

In gate circuits 30 and 31, signals of maximum document size of shaded, corrected digital image signals are extracted; they are supplied to the color separation 35 of next stage. For documents of a maximum of B4 size, the size signal B4 produced by the system timing signal forming means (not illustrated) is used as a gate signal.

Assuming that shaded digital image signals are VR and VC, VR and VC are supplied into the color separating circuit 35 where they are separated into multiple chrominace signals, also corrected by gamma correction simultaneously.

In this embodiment, a case where image signals are separated either one of three color signal such as red, blue or black is indicated as one example, accordingly, gamma-correction is also applied onto respective color signal.

Each separated color signal consists of color code data (2-bit data) and density data (6-bit data). As for the data of every these color signals subjected to gamma-correction, the data being stored in color separation map constituted by ROM can be used as one example. The separated color image data is transferred to the color image processing step. The latch processing has respectively done at each color image process.

First, the image data is supplied to the color ghost correction step 300 of the next stage where color ghost correction is conducted in the primary (horizontal) scanning direction and in the secondary scanning (drum revolution) direction. 300A shows the color ghost correcting circuit in the primary scanning direction, while 300B shows one in the secondary scanning direction.

This color ghost correction is made to prevent undesirable color ghost around letters in black during color separation. Some color separation map configurations produce red color around a black letter and blue color at its edge. The picture quality is improved by removing the color ghost. This removal is done only for color code data.

Other image processing includes resolution correction, partial color convension, and threshold correction for multivalueing, which are shown.

These processing (beside enlargement and reduction) are described with specific examples.

450 shows the resolution correction means. This correction means conducts contour correction alone which treats density data.

In image resolution correction means 450, there is provided a latch circuit (not shown in the drawing) at it's final stage and the density data corrected it's image resolution is latched by this latch circuit.

The next example is partial conversion. Partial conversion means 500 consists of a region extracting circuit 500A to detect the original picture region marked by color marker on the document, and a color data selecting circuit 500B to copy the extracted region in colors. Of course, it is possible to print the region out of the marked region in specified colors.

The region extracting circuit 500A provides the region signal that indicates a region enclosed by color marker. This signal and color code data are supplied to the color data selecting circuit 500B.

To the color data circuit 500B, both a signal to indicate which image processing should be conducted by the indicator/operation panel and BBR signal to indicate color in which image is to be taken and printed are supplied. Based on these signals and the input signals, determination is made whether or not resolution-corrected density data should be transmitted to the multivalueing means 600 of next stage.

For example, to simply conduct copy the document, it is copied in same colors, only image data with the same color as that for BBR signal is provided. To perform color conversion for the entire document (i.e. to perform conversion between red and blue), control is performed so that red image data is provided during the printing of blue image data, and that blue image data is provided during printing of red image data.

In conducting partial color conversion, black information in the region enclosed by a color marker is printed in that color. For example, if control is performed so that black information in the region enclosed by the red marker is printed in the phase where printing in red color is made, the information in this region can be partially converted for printing.

Thus, partial color conversion and color specification are realized only by use of a developing a system in which developing is conducted by revolving the drum for each color and fixing is conducted after the completion of development for the last color.

In this case, image pickup is conducted several times. Image printing can be made real time by performing image pickup and development several times. The real-time image printing decreases the size of memory needed for image storage.

Image data (density data) from the color data selecting circuit 500B is multivalued by the multivalueing means 600. The example shows the case where 6-bit density data is converted into 1-bit data (binary data, 1 or 0). The threshold data (6 bits) used as a standard for coding is set by automatically or manually.

The threshold selecting means 600A consists of the threshold selecting means 630 for manual setting and the threshold selecting means 610 for automatic setting. The threshold selecting means 630 has been designed to allow independent decision of threshold for each color. This means provides a manually set threshold upon which density data is coded.

The threshold selecting means 610 consists of an ROM that includes the predetermined threshold. Selection of manual or automatic setting of threshold is conducted by the EE release signal. The automatic setting mode (EE mode) is normally assumed. The BBR signal is also supplied to show in which sequence the developing machine is performing its operation.

Image data is coded into multi-value ( binary—4 value ) in multi-value coding circuit 600B. Then the image data coded into multi-value is fed into output device 700 via interface circuit 40. Interface circuit 40 has the first and the second interface, one of those interfaces is used for receiving patch-shaped image data used for performing toner concentration control.

The output unit 700 can be a laser printing machine. With the laser printing machine, multivaluing, for example binarized image is converted into a predetermined optical signal which is then nodulated based on binary coded data.

An electrophotographic color copying machine is used or a developing unit. This example shows 2-component noncontact jumping development along with reversal development which calls for no transfer drum used as conventional color image forming. To reduce the machine size, the working example uses the method in which development of three color (blue, red and black) images on an OPC sensitized material (i.e. drum) for image forming is conducted with three revolutions of the drum and then transfer is made once onto a plain paper for copying.

Described below is related to details of components for the color image processing apparatus of the invention.

Figure 29:
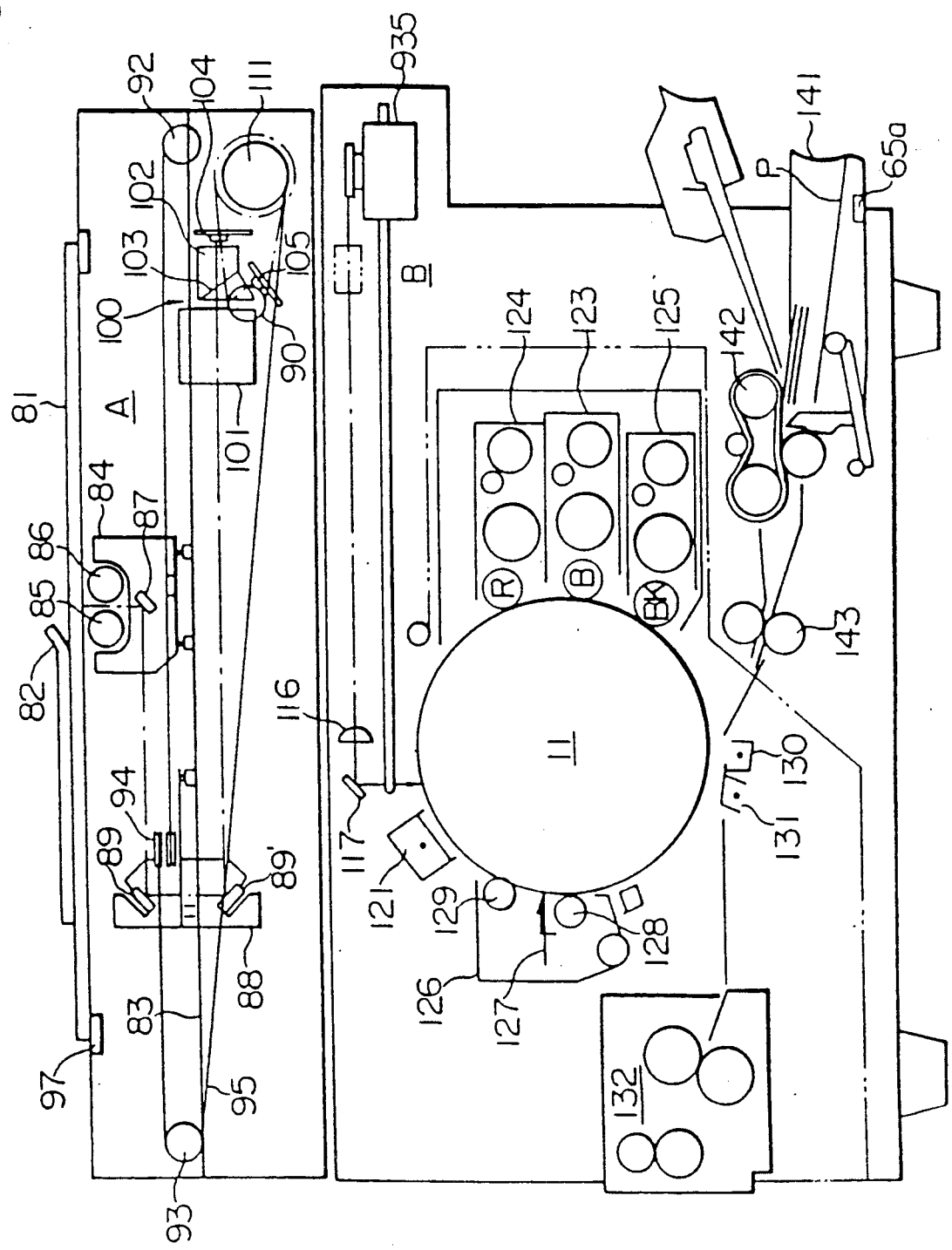
FIG. 29 is a configuration of a key part of the color copying machine applicable to the invention.
Figure 30:
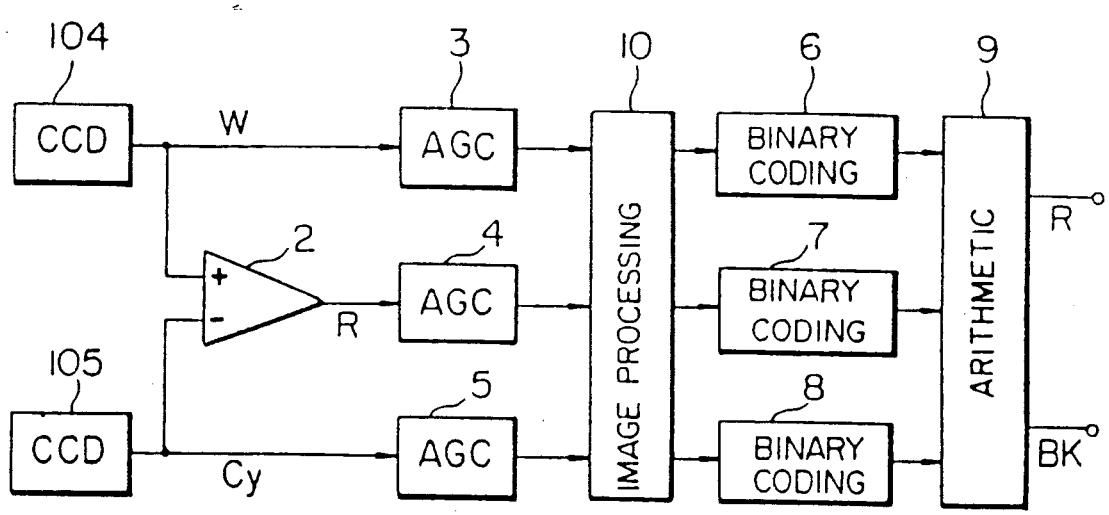
FIGS. 30 and 31 are block diagrams used for describing conventional units.
Figure 31:
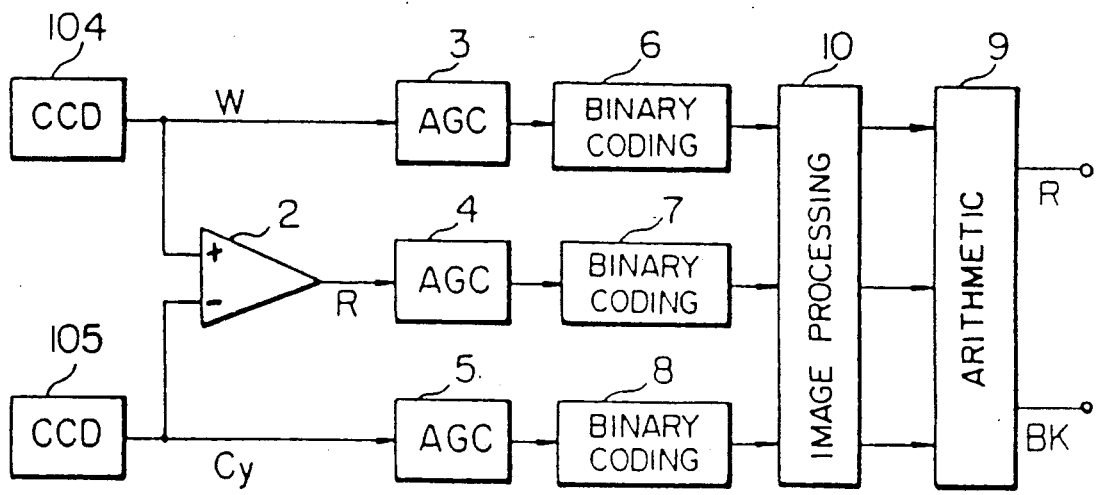

First, a brief structure of a simple color copying suited to the invention is described using FIG. 29.

The simple color copying machine separates chrominance information into three chrominance information to print color image. This example presents black BK, red R and blue B as these three chrominance information.

With the machine turned on, the document reading unit A is driven.

The first step is to the document 82 on the document table 81 is optically scanned by the optical system. The optical system consists of the fluorescent lamps 85 and 86, the carriage 84 with the reflecting mirror 87, and movable mirror unit 88 with the V mirrors 89 and 89'.

The carriage 84 and the moving unit 88 travel on the slide rail 83 by the stepping motor 90 at the predetermined speeds and in the predetermined directions.

Namely, rotation force transmitted from stepping motor 90 is further transmitted by belt 95 being extended among rollers 92 and 93 and pulley 111, thereby carriage 84 and movable mirror unit 88 are moved.

The fluorescent lamps 85 and 86 illuminate the document 82 on the mirror 87; the image is then supplied to the optical information conversion unit 100 through the V mirrors 89 and 89'.

To prevent optical emphasis and attenuance of a specific color in light scanning of a color document, warm white fluorescent lamps are used for the fluorescent lamps 85 and 86. Furthermore, to allow stable illumination, these fluorescent lamps are turned on or driven by a highfrequency power supply of approximately 40kHz. These lamps are kept warm by a stabilizer-used heater to ensure a constant temperature of their tube walls or to improve warm-up performance.

On the rear side of the left edge of the platen glass 81 there is the standard white plate 97 on which optical scanning is made to normalize the image signal into the equivalent white signal.

The optical information conversion unit 100 consists of the lens 101, the prism 102, the dichroic mirror 103, the CCD 104 on which red-color-separated image is projected and the CCD105 on which cyan-color-separated image is projected.

The optical signals from the optical system are focused by the lens 101; they are then separated by the dichroic mirror of the prism 102 into red-color information and cyan-color information.

Each of these color-separated images is formed on each CCD's receiving surface, whereby the image signal is converted into the electric signal. The image signal processed by the signal processing system; each chrominance signal is supplied to the printing unit B.

As shown in FIG. 1, the signal system includes not only the analog/digital converting means, but also such signal processing circuits as the color separating means and coding means.

The printing unit B possesses the deflecting unit 935. The deflecting unit 935 can be a galvanomirror, rotating polygon mirror, or a deflecting unit with a quartz-used optical deflector. Laser beam modulated by chrominace signal is deflected and scanned by the deflecting unit.

Upon the start of deflection and scanning, beam scan is detected by the laser index sensor (not illustrated) and beam modulation starts by the first chrominance (blue signal, for example). The modulated beam is so controlled that it scans the image forming unit (i.e. photosensitive drum) 11 with uniform charge by the electrizer 121.

The primary scan by laser beam and secondary scan by the rotating image forming unit 11 form a electrostatic image corresponding to the first chrominance (the first color signal) signal on the image forming unit 11.

The electrostatic image is developed by the developing unit 123 that contains blue toner. The predetermined bias voltage from the high-voltage source is applied to the developing unit 123. This development forms blue image.

The blue toner image rotates without contacting with the cleaning blade 127 released. Like the first chrominance signal, electrostatic image is formed based on the second chrominance signal (red signal, for example). By use of the developing unit 124 accommodating red accommodating, this is developed for form red toner image.

Likewise, electrostatics image is formed based on the third chrominance (black) signal, and black toner image is formed based on chrominance (black) signal. This means a multiple-color toner image has been formed on the image forming unit 11.

The above description is related to the forming of 3-color toner image; and of course this is applicable to the forming of 2- or 1-color image.

On the other hand, the recording paper P supplied by the paper feeding unit 141 through the feeding roll 142 and the timing roll 143 is carried onto the image forming unit 11, with its timing being in line with the revolution of the image forming unit 11. Then, multi-color toner image is transferred onto the paper by the transferring electrode 130 to which high voltage is applied to the high voltage supply and it is separated by the separating electrode 131.

The recording paper P is then carried to the fixing unit 132 for obtaining color image by fixing.

After the process of transfer, the image forming unit 11 is cleaned by the cleaning unit 126 for preparations for the next image forming.

To facilitate toner collection by the blade 127 of the cleaning unit 126, the predetermined DC voltage is applied to the metallic roll 128 of the blade 127. This metallic roll 128 is arranged on the surface of the image forming unit 11 (not contacting the surface).

After cleaning, the blade 127 is released from the contact state. The auxiliary cleaning roller 129 is installed to eliminate unwanted toner left after the release. The roller 129 is revolved and contacts in the direction opposite to the image forming unit 11 to satisfactorily clean and remove unwanted toner.

The paper feeding unit 141 is equipped with the sensor 65a from which the detection output is forwarded to the CPU.

A constitution of every parts in FIG. 1 is explained in order. Firstly, color separation for separating plural color signals from red and cyan output signals subjected to shading correction is carried out. At the same time, gamma-correction is also applied. The color signals to be separated represent three colors such as black, red and blue.

A conventional way that uses color separation after coding the image signal is not appropriate for a variety of signal processing if the fact is taken into account that color-separated data is a binary coded signal.

Figure 5:
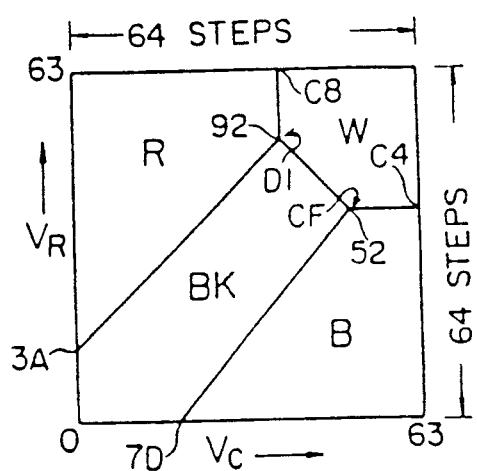
FIGS. 5 and 6A-6C illustrate typical color separation maps.

The method of the invention is to perform color separation before the coding process. For this purpose, the map as shown in FIG. 5 is provide. The color separation map should consist of an ROM (bipolar ROM). Color codes (red, blue and black) and density information subjected to $\gamma$-correction are stored into the addresses given by 6-bit image data VR and VC with half tone level. That is,

*One pixel = Color code + Density information*

For example, a pixel with 30 levels of density in hex (XX011110) provides:

Red = 1 0 0 1 1 1 1 0 = 9E

Color code Density information
Blue = 0 1 0 1 1 1 1 0 = 5E
Black = 0 0 0 1 1 1 1 0 = 1E
White = 1 1 0 1 1 1 1 0 = DE Either DE or C0 can be taken for white.

These data are stored in corresponding addresses, as shown in FIG. 5 Color codes include white, red, blue and black and consist of two bits. If there is need for increase in color codes, the number of corresponding bits should be increased. The density information consists of 6 bits; four bits of which are enough for text information. It is obvious to change the number of bits corresponding to the image considered. Boundaries for color separation in FIG. 5 must be determined taking the output variation of the line edge into account; otherwise, unwanted color ghost (kind of incorrect color forming at the edge of back or other letters), is produced.

To pick up a certain color or any other colors than red, blue and black, the color separation maps are prepared which is different from those in this example, so that one of them can be chosen as required. Another method is to install color separation ROM (ROM pack, practically) which can be replaced.

Figure 4:
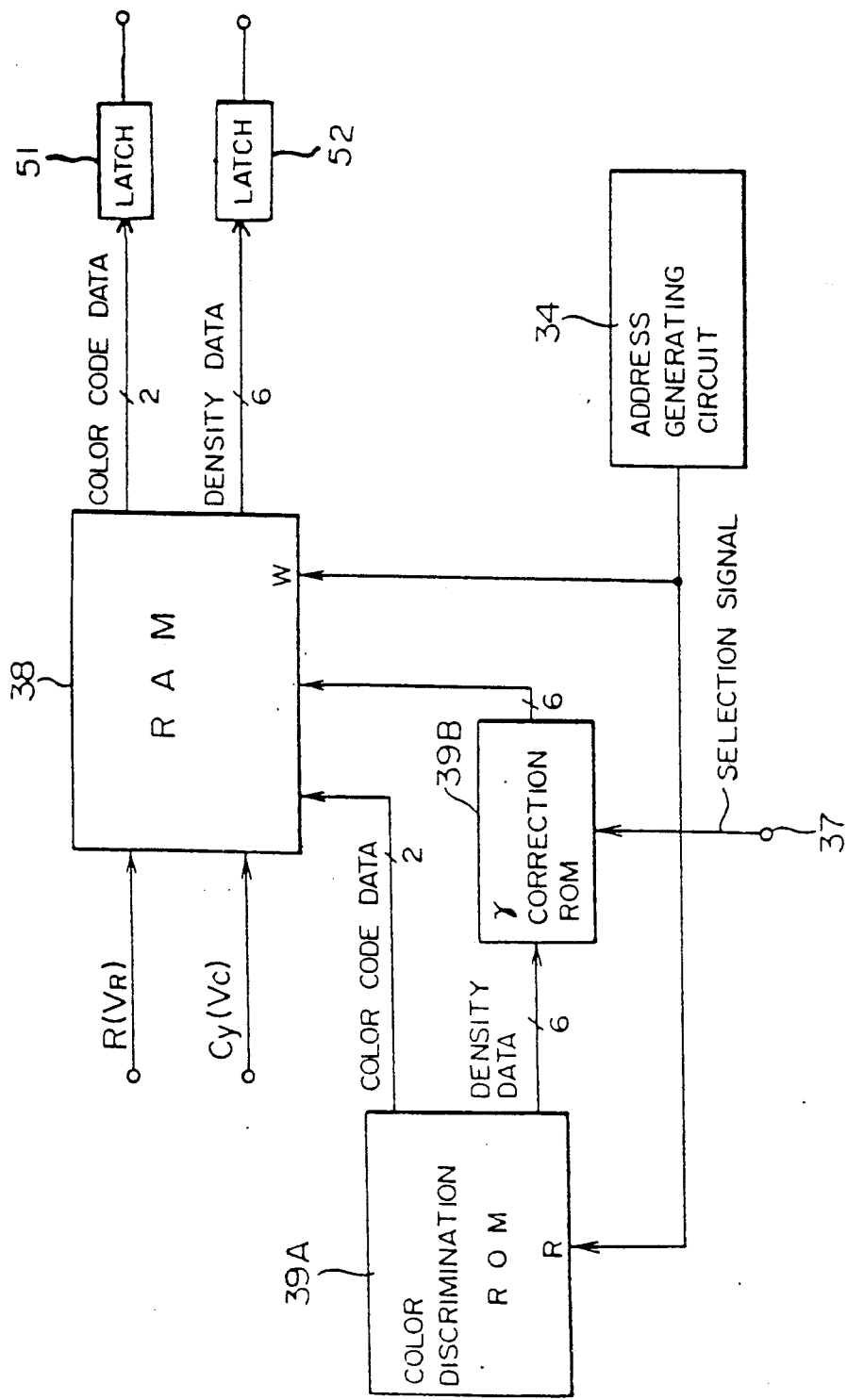
Figure 6A:
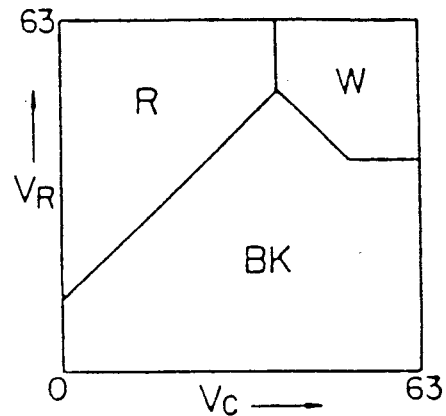
Figure 6B:
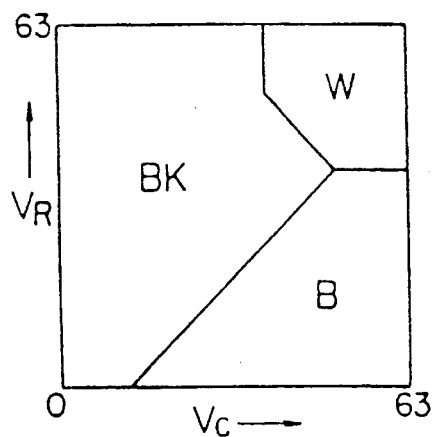
Figure 6C:
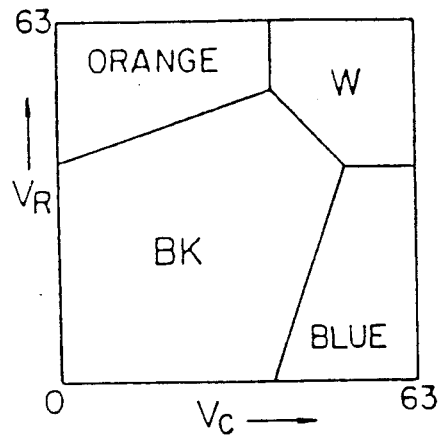

FIG. 6A, B show 3-color maps, and FIG. 6C, 4-color map. These maps' data also shows the data gotten after the gamma-correction.

Figure 3:
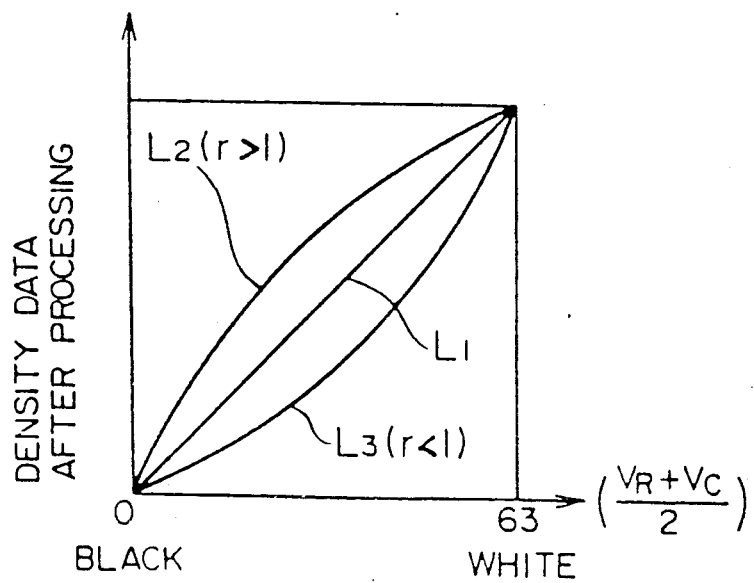
FIG. 3 is a descriptive diagram for gamma-correction curve.

FIG. 3 shows an example of gamma-correction curve. The curve L2 is an example with $\gamma > 1$, while the curve L3 is an example with $\gamma < 1$.

Figure 2:
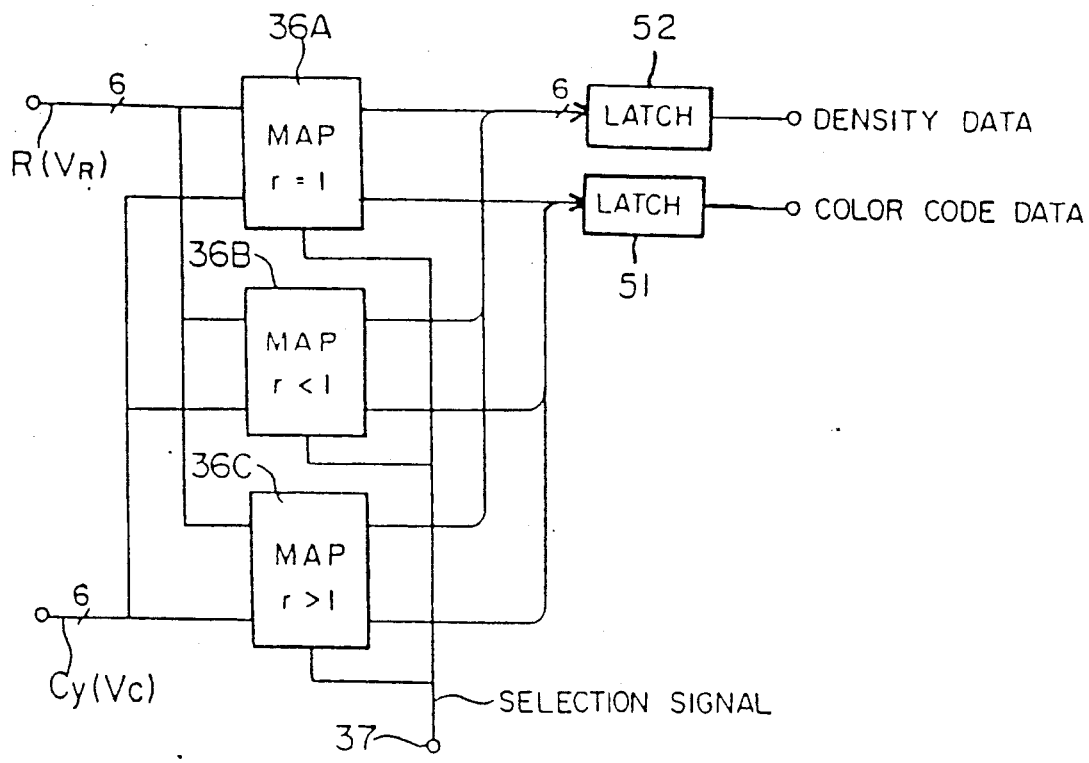
FIGS. 2 and 4 are block diagrams showing embodiments of color separation circuits.

FIG. 2 shows a specific example of the color separation circuit 35. As shown in FIG. 3, three correction curves L1 to L3 including no-correction case ($\gamma = 1$) are used with color separation ROMs 36A to 36C.

In each of these ROMs the same color code data and density data after gamma-correction obtained according to each correction curve are stored.

Which gamma-correction curve is to be used is selected by the selection signal supplied to the terminal 37.

If the color separation ROM has a large capacity, each data of the color separation ROMs 36A to 36C can be stored.

Color code data and density data subjected to gamma-correction are respectively latched in latch circuit 51 and 52.

FIG. 4 shows another example of the color separation circuit 35.

This example uses a gamma correction ROM 39B which stores gamma correction data shown in FIG. 3.

The color separation ROM 39A stores color code data shown in FIG. 5 and density data before gamma-correction. Color code data and density data are read as required. Density data is equipped with the specified gamma-characteristic; both gamma-corrected density data and color code data are written into the RAM 38.

Image signals VR and VC which have been color-separated and shade-corrected, are supplied as address data of the RAM 38; the color code data and density data determined by the address are read.

The density data which has been read is gamma-corrected by the gamma-correcting ROM 39B, and the image signal after gamma-correction can be immediately obtained.

As shown in FIG. 3, the gamma-correcting ROM 39B stores density data used to select and provide gamma-characteristic by the selection signal from the terminal 37.

The address data used for reading from the ROM 39A or writing into the RAM 38 consists of the address generating circuit 34.

In color separation circuit 35 constituted as mentioned above, color code data and density data subjected to gamma-correction are respectively latched in latch circuit 51 and 52.

Next, the color ghost correcting circuit 300 is described. This circuit is used to eliminate color ghost for image data colors of which have been separated.

FIG. 7 shows an example of color ghost generation. In this example, Japanese letter " 性 (sei, sex) " is picked up and color ghost generated after color separation is shown. This example depicts that the color ghost of red and blue appears at the edge of black line, that of black appears at the edge of blue line, and that of red appears at the edge of red line, as shown in FIG. 8A through C.

Other color combinations produce different color ghosts.

To eliminate color ghost, the color pattern method is used since fixed color ghost appears for the original color like:

Original: Black→Color ghost : Red and blue
Original: Red, blue→Color ghost : Black With the color pattern method, the original color can be identified by knowing how a color for a certain pixel and those for its surrounding pixels appears (pattern).

FIG. 9 shows an example which determines the color pattern of the target pixel and its surrounding pixels, and the color of the target pixel to be determined at that time.

For No. 1 which has a color pattern of white and black at its edge, the blue color of that pixel is assumed to be a color ghost produced at the black edge. Likewise, for No. 3, red is assumed to be color ghost of black color. Accordingly, for Nos 1 and 3, that pixel color is changed from blue or red to black.

On the other hand, for Nos. 2 and 4, no color ghost occurrence is assumed, and the color of that pixel is directly output without being changed.

It is difficult to implement such processing by use of an arithmetic circuit. In effect, this example uses LUT (look-up table) in ROM form. One or two-dimensional system can be used for color pattern. Assuming that the number of colors be N and the number of surrounding pixels including that pixel M, the size of color pattern size is:

$$N^M$$

This means that use of the 2-dimensional system increases M extremely and is not practical. In other words, use of the 2-dimensional system can provide less surrounding pixels in both primary and secondary directions, with demand for more patterns. FIG. 10 indicates the relationship between size and color pettern.

If a color pattern with a size of 1×7 is used, the color code is entered as an ROM address. For such color pattern as:

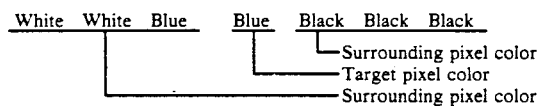

the color patter is like:

| White | White | Blue | Blue | Black | Black | Black |
|-------|-------|------|------|-------|-------|-------|
| 11    | 11    | 01   | 01   | 00    | 00    | 00    |

And the address is:

3D40

As shown in FIG. 9 the address contains the black code:

00

By use of this, table look-up work is made.

Since a 14-bit address is required for a pattern of 1×7, a bipolar ROM should meet the demand for entry of an address of 14 bits and a color code of 2 bits. However, bipolar ROMs with such a large capacity cannot easily found and would be very expensive if any.

The working example shows the case where ROM is searched by the first one pixel, and six other pixel codes are used to perform table look-up work. In other words, this example calls for two ROMs; the first of which starts with black and blue, while the second of which, red and white.

| The first ROM (black/blue ROM) Leading code black BK (00), blue B (01) Address contents | |
|---|---|
| 00000000000000 | (BK BK BK BK BK BK BK) |
| . | . |
| . | . |
| 00111111111111 | (BK W W W W W W ) |
| 01000000000000 | (B BK BK BK BK BK BK) |
| . | . |
| . | . |
| 01111111111111 | (B W W W W W W) |
| The second ROM (red/white ROM) Leading code Red R (10) white W (11) Address contents | |
| 10000000000000 | (R BK BK BK BK BK BK) |
| . | . |
| . | . |
| 10111111111111 | (R W W W W W W) |
| 11000000000000 | (W BK BK BK BK BK BK) |
| . | . |
| . | . |
| 11111111111111 | (W W W W W W W)' |

The second ROM (red/white ROM)
Leading code Red R (10) white W (11)
Address contents
10000000000000 (R BK BK BK BK BK BK)
10111111111111 (R W W W W W W)
11000000000000 (W BK BK BK BK BK BK)
11111111111111 (W W W W W W W)'

Since the color pattern of FIG. 9 starts with white color, the second ROM is selected.

FIG. 11 shows an example of the color ghost correcting circuit 300. This color ghost correction is made both in the primary (horizontal) scan direction and the secondary (vertical) scan direction.

This example shows the case where color ghost correction is made in both the horizontal and vertical scan directions by use of image data for 7 pixels in the horizontal direction and 7 lines in the vertical direction.

The color ghost correcting is made only for color codes of the image data.

Color codes read from the color separating ROM is first supplied to the ghost correcting circuit 300A in the primary scan direction. As a result, color code data are supplied successively to the shift register of 7 bits for parallel operation. This parallel color code data of 7 pixels is supplied to ROM 302 for color ghost eliminating in the horizontal direction where ghost elimination is performed for each pixel. This is a description of an example of use of ROM 302. Upon the completion of ghost processing, the latch circuit 303 is used to latch operation.

On the other hand, the density data from the color separating ROM is supplied to the latch circuit 306, through the shift register 305 (7-bit configuration) for timing control, in which data transfer requirements are determined so that color code data followed by density data in serial data.

To the line memory 310 In the color ghost compensating circuit 300B, serial processed color code data and density data are supplied.

The line memory 310 to eliminate color ghost in the vertical direction uses 7-line image data. A 8-line memory is used for real-time processing. Of course, a 7-line memory can be used for real-time processing.

A 8-line color code data and density data are separated by the gate circuit group 320 installed at the later stage. The gate circuit group 320 provides gate circuits 321 through 328 corresponding to line memories 311 through 318.

Output data controlled for simultaneous operation by the line memory 310 is separated into color code data and density data by the gate circuit group 320. These separated color code data are supplied to the selecting circuit 330 where 7 (of 8)-line color code data is selected for use of color ghost elimination. If line memories 311 to 317 are once selected, line memories used are successively shifted to 312 to 318 at the next step, and so on. Selected 7-line memory color code data controlled for simultaneous operation is supplied to the next-stage ROM 340 for ghost elimination in the vertical direction, where color ghost is eliminated.

Then, latch is conducted by the latch circuit 341.

On the other hand, the density data separated by the gate circuit group 320 is supplied directly to the latch circuit 342, where it is timing-adjusted with color code data before being output.

This resolution correcting (MTF correction) has been designated for being conducted after color separation.

The conventional color separation used to be conducted after coding image data as described before, and this calls for resolution correction prior to the binary coding. Color image processing apparatus with this method of color separation use multiple CCDs to pick up color-separated images on the document and must perform resolution correction for each CCD output. In other words, multiple circuits are needed for resolution.

In addition, optical lens's MTF is not the same for each color separation work, making MTF correction parameters different for each resolution correcting circuit.

This invention conducts resolution correcting after color separation but before coding. The information to be handled is single, so this way of color separation provides advantages for practical use including compactness of circuit size and simple procedure for determining auxiliary parameters.

The next example of image processing is a partial color conversion.

Partial color conversion is an editing method in which image in the region specified by color maker or outside the region is copied in the maker's color.

Conventional method is to perform positioning by use of a digitizer. Then, scanning is performed for an original picture. Operation of switches for positioning data entry is made for every time of positioning. The positioning is made not for all shapes but for a square or rectangle.

Figure 12A:
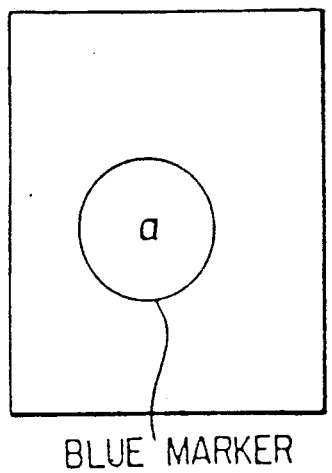
FIGS. 12 and 13 present descriptive illustrations for partial color convension.
Figure 12B:
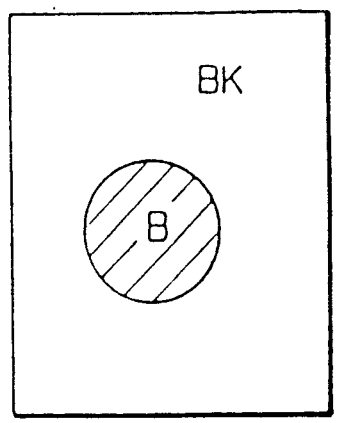

The partial color conversion described below allows an arbitrary region (indicated by a marker) to be copied in the marker's color. For example, specifying the region by a blue marker, as shown in FIG. 12, the region a is automatically detected and the image in the region a is copied in the marker's color (blue). The outside of the region a is copied in white/black color. The marker color can be red. The partial color conversion is performed for a white/black document.

Figure 13:
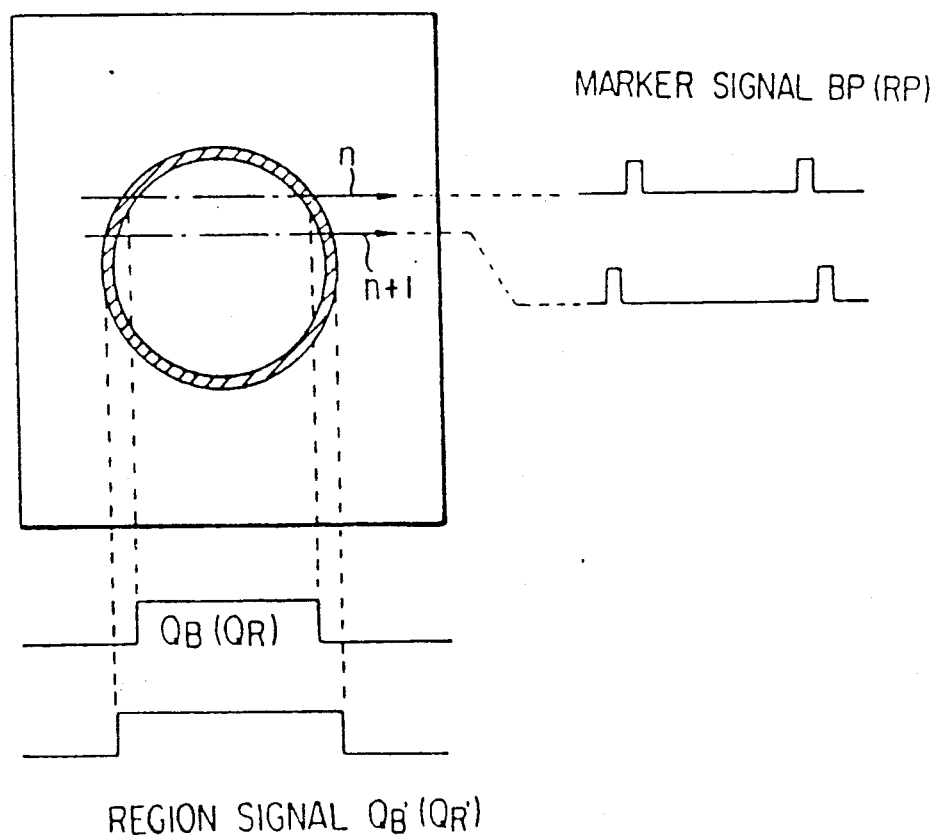

To copy the image in the specific region a, it is necessary to detect marker signals BP and RP (actually, color code data) of marker signals indicating color marker region, and region signals QB' and QR' indicating the region a, as illustrated in FIG. 13.

This is realized by installing the color data selecting circuit 500B along with the region extracting circuit 500A, as shown in FIG. 1. The color data selecting circuit 500B is intended for selecting density data of development color that corresponds to the copy sequence (development sequence) for partial color designation, and for selecting density data of development color that corresponds to the copy sequence for ordinary copy operation.

FIG. 14 presents its specific examples, in which each bit for color code data obtained by scanning color marker is supplied to the color marker detecting circuit 501 to check for presence of a specific color marker. The working example presents the case where two colors, red and blue, are used for markers, and the marker signals BP and RP are detected.

The marker signals RP and BP are each supplied to the pre-processing circuits 502 and 503, respectively, so that they are marker signals dedicated to the designated region. The pre-processing herein means a kind of signal-waveform shaping. The working example presents the pre-processing circuits 502 and 503 consisting of the circuits 504 and 507 to correct portions not clear, and the noise correction circuits 505 and 508 (both in the primary scan direction) and in the circuits 502 and 503 to correct marker breaking in the secondary scan direction, and pre-processing circuits 502 and 503. In the correction of color marker which is not clear, a color marker portion (which is not clear) of 16 dots/mm or more is corrected, while in noise correction, a data absence of 8 dots/mm or less is corrected.

The marker signals RP and BP which have been waveformshaped are supplied to the region extracting section 520 along with the color codes where the gate signal S for extracting density data, formed based on the region signal that indicates the inside of the designated region a, is scanned for each scan line.

The following presents descriptions of a more specific configuration.

FIG. 15 shows an example of the color marker detecting circuit 501, designed to detect the marker's color by color marker scanning.

The blue color code data is "01", while the red color code data is "10".

As illustrated, higher-order-bit data and its inverted data by the inverter 511 are supplied to one NAND circuit 513.

Likewise, lower-order-bit data and its inverted data by the inverter 512 are supplied to the other NAND circuit 514. In addition, the ANDed output of the vertical valid region signal V-VALID and size signal B4 is supplied to each of the NAND circuits 513 and 514 as gate signals. 515 indicates an AND circuit.

As a result, for the blue marker, the terminal 516 provides the blue marker signal BP which has a pulse width corresponding to the marker contour thickness.

Similarly, for the red marker, the terminal 517 provides the red marker signal RP. FIG. 13 presents an example of the marker signal.

Figure 16:
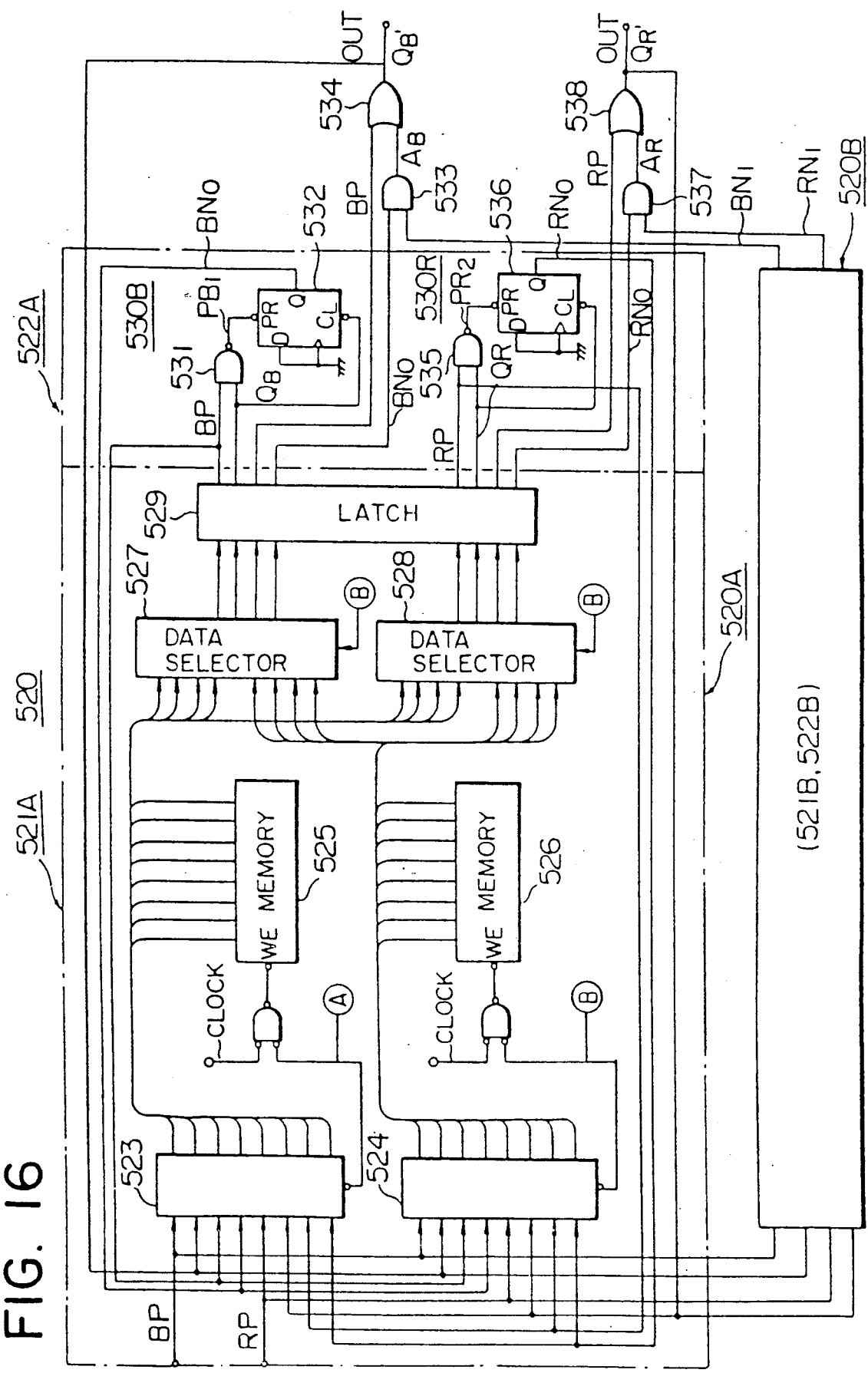

FIG. 16 presents an example of the region extracting section 520.

The region extracting section 520 consists of the first region extracting section 520A and the second region extracting section 520B, each of which has the data storage circuits 521A and 522A, respectively, and region arithmetic circuits 521B and 522B, respectively. In addition to the function to extract a blue marker region, the first and second region extracting sections 520A and 520B both have a function to extract a red marker region. This description is presented with respect to blue marker region extraction.

A blue marker region signal is formed by calculating the region signal of the current scan line based on the region signal obtained by the most recent scan and the marker signal obtained by the scan of the current scan line.

To implement this, calculation must be done by use a period for at least three lines. Thus, the first data storage circuit 521A must have the feature to store the region signal for one line which is the last data of the most recent scanned line, the feature to store the first and second region signals (actually, NAND outputs) formed by the marker signal BP, and the feature to store the region signal of the current scanned line obtained by calculating these region signals.

In the working example, the second region signal is formed by reading line memories in the opposite direction, and the number of line memories is 16. The red marker must also be detected, calling for the total number of 32 line memories.

As a result, the first data storage circuit 521A has a pair of memories 525 and 526, each of which consists of 8 line memories. To select each of them for line, a pair of Schmitt trigger circuits 523 and 524, a pair of data selectors 527 and 528 and the latch circuit 529 are installed.

To the first data storage circuit 521A, the three signals obtained by the first region arithmetic circuit 530B for blue color are supplied as input signals along with blue marker signal BP.

In the first region arithmetic circuit 530B, the blue marker region signal QB' on the current scan line n is formed by the just previous region signal QB and the marker signal BP on the current scan line.

Figure 17:
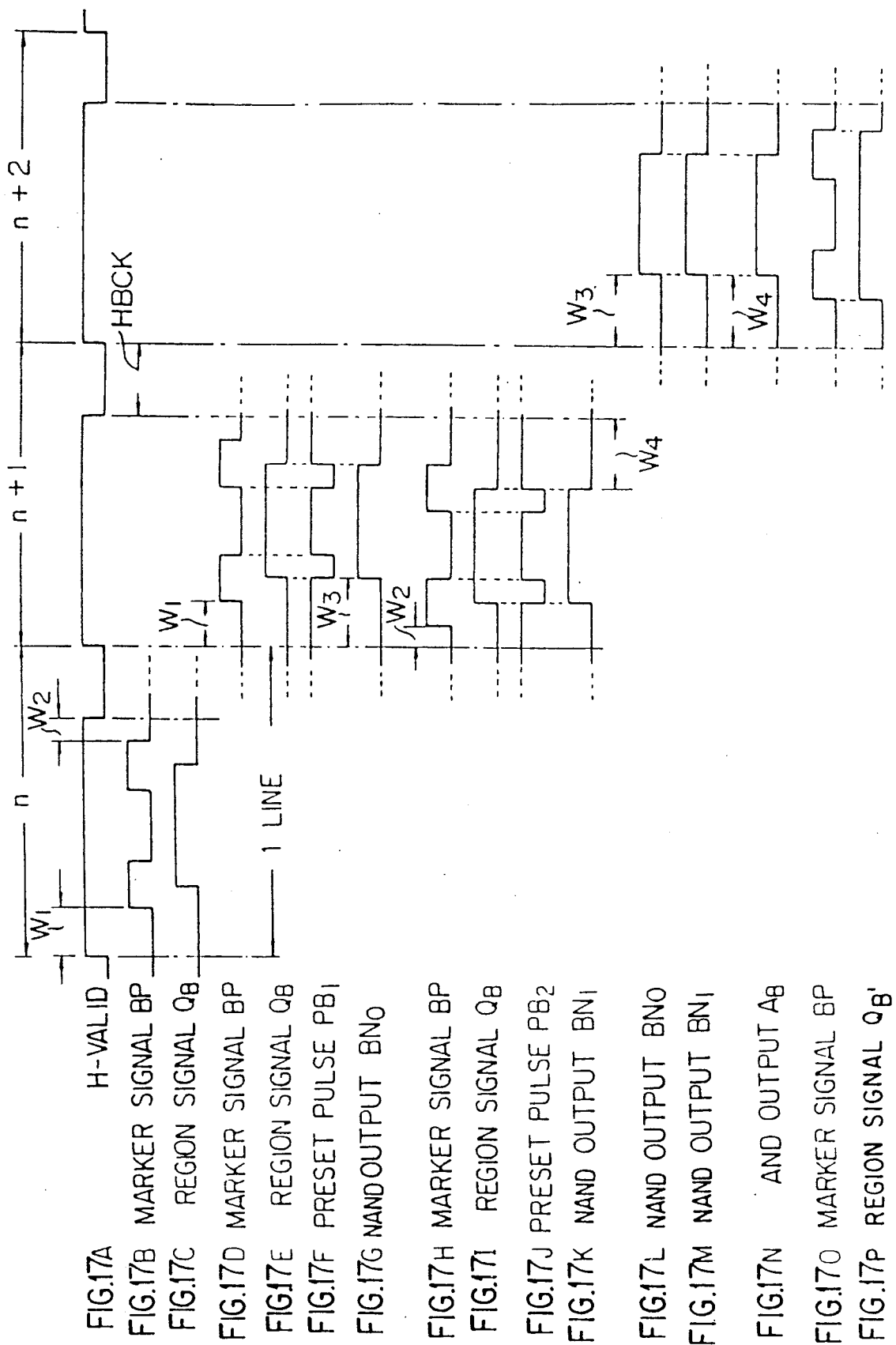
FIG. 17 is a waveform used for description of the region extracting assembly's operation.

For convenience of description and taking the scan line n into account as shown in FIG. 13 region signal QB (region signal of the scan line (n−1)) and the marker signal BP have the relationship as shown in FIG. 17B, C. These signals are stored line by line onto the memory 525. For the next scan line (n+1), these signals are read through the data selector 527 and the latch circuit 529 (FIG. 17D, E).

A pair of the signals QB and BP is supplied to the NAND circuit 531, and its NAND output PB1 (FIG. 17F) is supplied to the D-type flip-flop 532 through its preset terminal PR. Likewise the region signal QB is supplied to the clear terminal CL. As a result, the first NAND output (first contour signal) as shown in FIG. 17G is obtained.

The first NAND output BNO and the marker signal BP are stored into the memory 526 successively, and for the scan line (n+1), the Schmitt trigger circuit 524 is controlled to be kept active.

The second region extracting section 520B sees the similar operation at the same timing, provided that all the memories to the section are address-controlled for forward writing and backward reading.

Accordingly, the output timing for the marker signal BP and region signal QB is W1 for n lines, while W2 for (n+1) lines, making reading speed little faster (FIG. 17H, I). As a result, the second NAND output BN1 is one as shown in FIG. 17K. The marker signal BP and the second NAND output BN1 are stored in the data storage circuit 521B.

For the next scan line (n+2), the first NAND output BN0 the marker signal BP and the NAND output BN1 is read out (FIG. 17L to 0).

Since the memory installed to the second region extracting section 520B is intended for forward writing and backward reading, as described above, the read timing W3 for the first NAND output BN0 and the read timing W4 for the second NAND output BN1 agree in this example.

Both of the signals are supplied to the NAND circuit 533. With NAND output AB and the marker signal BP (FIG. 17N,O) supplied, OR output QB' is obtained, as shown in FIG. 17P.

The OR output QB' is the very signal that shows the inside of the blue marker contour illustrated on the current scan line n. That is, the OR output is the region signal QB'.

The region signal QB' is used as the region signal QB right before on the next scan line, so it can be readily understood that the signal is fed back to the data storage circuits 521A and 521B.

Thus, use of a pair of NAND outputs BNO and BN1 obtained by making memory read direction reversed allows correct detection of the marker region.

This is applicable to the detection of red marker, and description of the region arithmetic circuit 530R is omitted, provided that 535 is an AND circuit, 536, D-type flip-flop, 537, AND circuit, and 538, OR circuit QR' present the region signal of the red number.

Schmitt trigger circuits 523 and 524, memories 525 and 526, and data selectors 527 and 528 have been prepared in pair taking the presence of blue and red markers concurrently. These are selected by 2-line cycle selection signals supplied to the terminals A and B.

Figure 18:
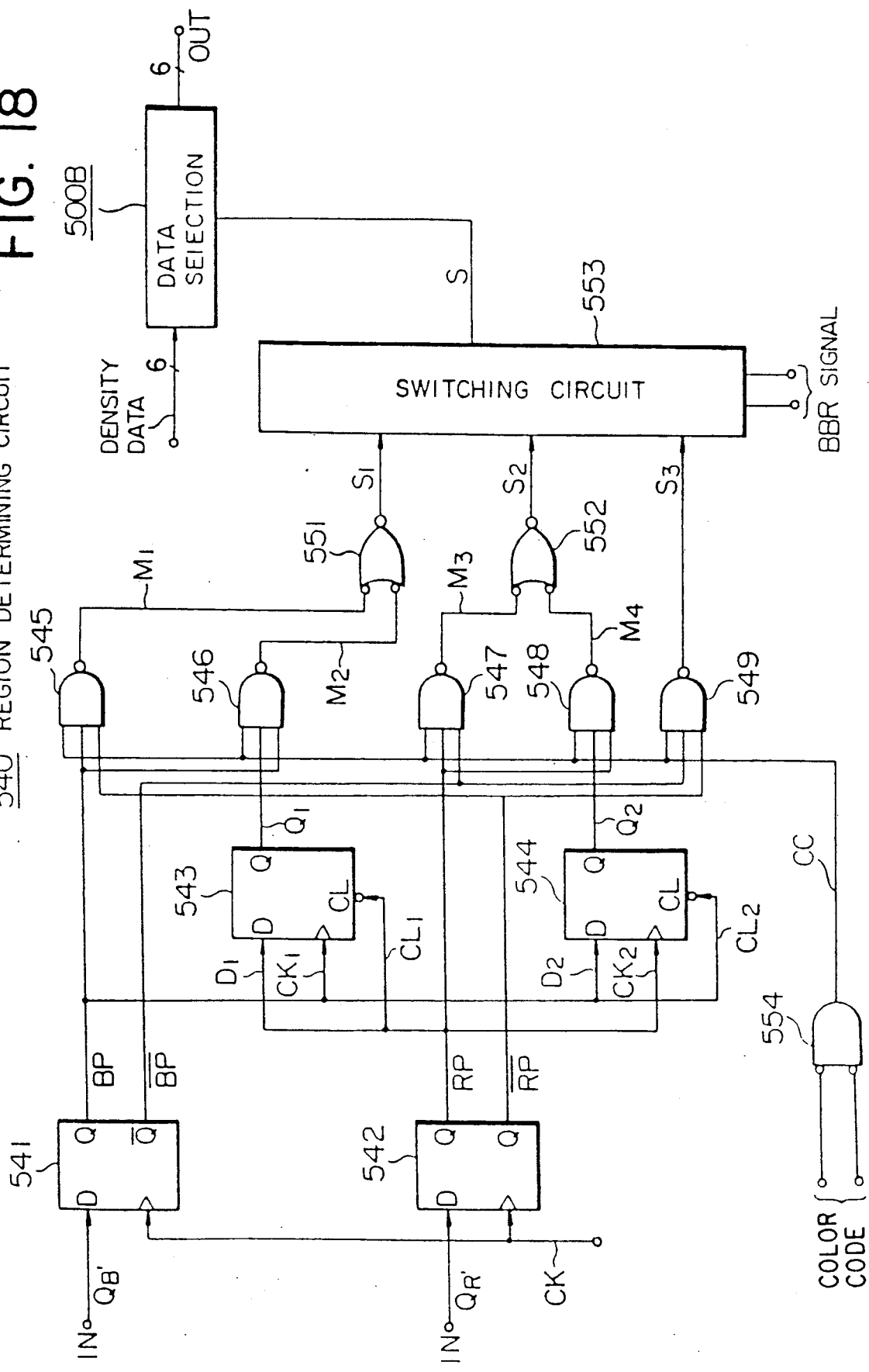
FIG. 18 shows a block diagram for region determining circuit.

The region signals QB' and QR' supplied to the output terminals are supplied to the region determining circuit 540 as shown in FIG. 18.

Figure 19A:
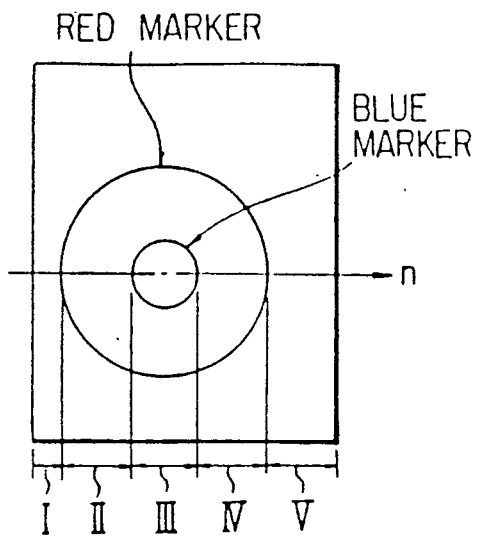
Figure 19B:
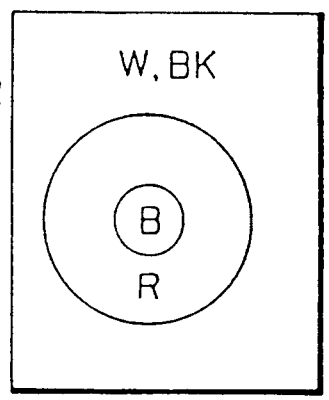

The region determining circuit 540 is a control means for the region signal used to recording images as shown in FIG. 19B, if the marker designation is like one shown in FIG. 19A.

In the periods I and V of the figure, a white/black image is recorded, while in the periods II and IV, a black image is recorded as a red image. In the period III, a black image is recorded as a blue image by allowing density data gate signal S to be formed from region signals QB' and QR'.

The region determining circuit 540 has flip-flops 541 to 544. Region signals QB' and QR' latched by the forward flip-flops 541 and 542 are supplied to their corresponding NAND circuits 545 to 548, while region signals QB' and QR' latched by backward flip-flops are supplied to their corresponding NAND circuits 545 to 548. To each of the NAND circuits 545 to 548, color code data CC indicating black color is supplied via the AND circuit 554. On the other hand, to the switching circuit 553, the BBR signal is supplied which shows the copying operation is done in what color. Therefore, to consider relation with signals on the scanning line showing on FIG. 19A, the circuits will be shown as FIGS. 20 and 21.

FIG. 20 shows that what types of FF output Q1, Q2 (FIG. 20H, L) will be obtained by region signals BP, RP (FIG. 20A to D).

With A to C signals shown in FIG. 21 the first AND circuit 545 provides the first NAND output M1 as shown in FIG. 21D. Likewise, the second NAND circuit 546 provides the second NAND output M2 shown in FIG. 21G based on the E, F input signals in FIG. 21. As a result, the AND circuit 551 provides the gate signal S1 related to the period III shown by H in the FIG. 21.

Similarly, I to K input signals in FIG. 21 provides the third NAND output M3 of the FIG. 21L, while input signals in FIG. 21M and N provide the fourth NAND output M4 in FIG. 380. As a result, the second AND circuit 552 provides the gate signal S2 (FIG. 21P) related to the periods II and IV.

With Q to S signals in FIG. 21, the fifth NAND circuit 549 provides the gate signal S3 (FIG. 21T) corresponding to the periods I and V.

One of the gate signals S1 to S3 is selected by the switching circuit 553 corresponding to the BBR signal that indicates the copy sequence. Accordingly, the gate signal S1 is selected for blue color recording mode, while the gate signal S2 is selected for red color recording mode. Likewise, gate signal S3 is selected for black color recording mode.

Figure 22:
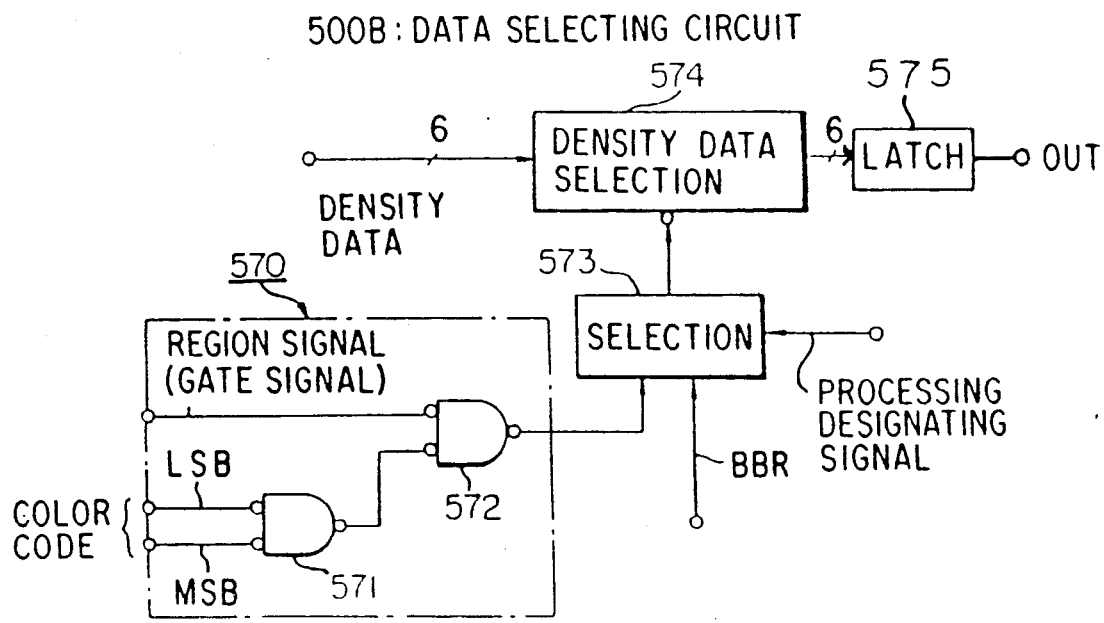
FIG. 22 is a block diagram for data selecting circuit.

Gate signals S1 to S3 from the switching circuit 553 are supplied to the color data selection circuit 500B shown in FIG. 22.

First, the gate signal S and the color code data are supplied to the gate circuit 570. The gate circuit 570 consists of a pair of NAND circuits 571 and 572.

If color code data is black, the gate signal S is gated, and either of this signal and BBR signal is selected in the selection circuit. Which signal is to be taken is controlled by the processed signal.

With these outputs, density data is selected in the selection circuit 574 that corresponds to the color code data.

In this case, white density data (always 1) of white color is selected in the period outside the period where there is no gate signal S. One example of this is that white data is always selected outside the period III in the blue color recording mode. As a result, blue image is recorded in periods III alone in the blue recording mode, while red image is recorded in periods II and IV in the red recording mode, and periods I and V are recorded in black color in the black recording mode (FIG. 19B).

Selected density data is latched by the latch circuit 575.

As a result of use of the region determining circuit 540, inside marker color is taken precedence. The region not overlapped is copied by the color of marker that designates the region not overlapped.

The following description is related to some modifications of partial color conversion.

The partial color conversion is related the detection of the designated region and processing of image data or color in the specified region. This is applicable to partial region extraction, erasing, reversing, mirror-image, enlargement, reduction and position movement and their combination.

It is possible to carry out processing for the detected region according to the predetermined contents.

The background color of the document is white, but other colors are allowable.

Red colors (including orange and pink) or blue colors are appropriate for color markers since these color are not liable to reproduction in normal copying.

If no color marker can be used directly for the document, a transparent sheet can be used.

Figure 23:
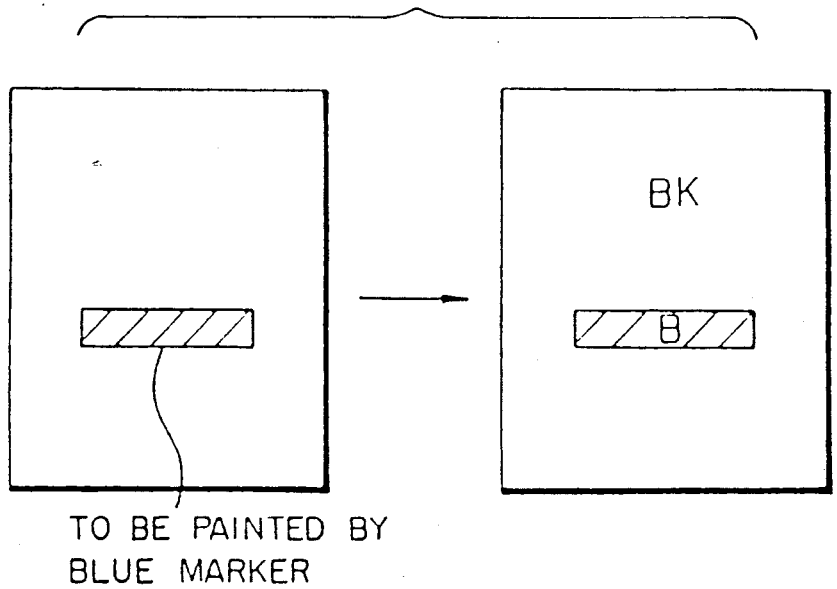

As shown in FIG. 23 the designated region can be painted over by color marker.

The following description is related to automatic and manual density adjustment for image processing. The density adjustment is done by real time process.

Figure 24:
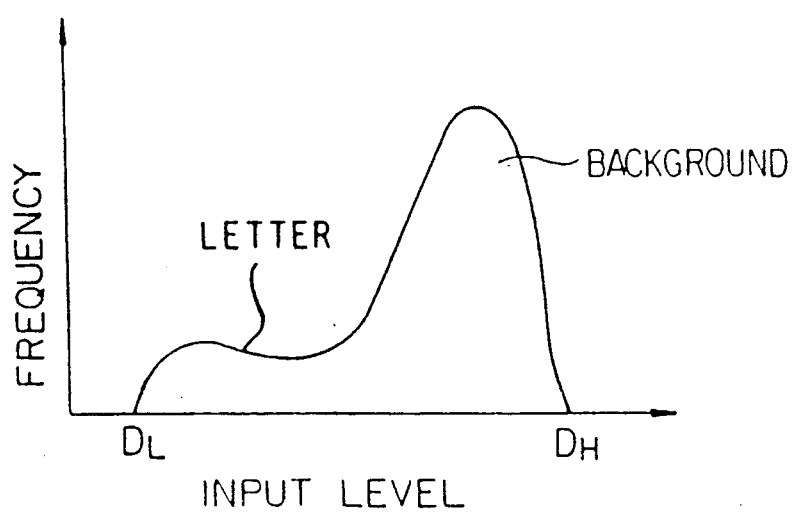
FIG. 24 is a characteristics of a density histogram.

To set document density real time, document density histogram shown in FIG. 24 is produced, but the pre-scanning is necessary for this method.

The new method has the threshold determining mean 610 which sets appropriate document density real time without pre-scanning and without an increase in circuit size. The threshold determining mean 610 is installed in conjunction with the multivalueing circuit 600B.

The major feature of this mean lies in the determination of threshold line by line based on maximum DH and minimum DL in each scan line. In color copying which carries out in the sequence of blue, red and black, density data of the pixel corresponding to the color to be currently copied is sampled, and both maximum and minimum values are obtained for each color.

The following shows one example of calculation of threshold for digitizing.

$$Ti = ki(DH - DL) + \alpha i + DL$$

where i = blue, red or black.

k = coefficient in the range of 0.1 to 0.8, 0.2 to 0.6 being desirable.

α = correction value

Both k and α vary depending on color, and obviously on density data stored in the map for color separation above described.

For example, k would be ½ to ⅓ for black, and ½ for red and blue. α would be −10 for black, and 2 to 6 for red or blue.

Noises may be mixed up in calculation of the maximum and minimum values. To prevent this, density data which have not been sampled can be used if there is drastic change in density data, or a mean value of two adjacent density data can be used. Also to prevent calculated threshold from being changed drastically, the mean value of the thresholds for multiple lines can be used as a threshold for the current line.

In multivalueing, it is obvious to select coefficients k and o for their thresholds.

To copy the original picture in a signal color, coefficients k and σ vary depending on color. In other words, the original document usually includes letters in black color, with less letter in other colors. Determination of threshold based on black color results in scattered reproduction image in red or blue color. On the other hand, determination threshold based on red or blue color results in dissatisfactory of reproduction image in black color.

To prevent this, thresholds must be manually set for each color to address them in color code for each pixel during digitizing, if the automatic threshold means 610 is not provided.

If the automatic threshold means 610 is provided, the density data arrangement of color separation ROM should be changed, and other color images should be satisfactorily reproduced based on thresholds selected in copying in designated colors.

The following shows specific example of the automatic threshold 610 determining means.

Figure 25:
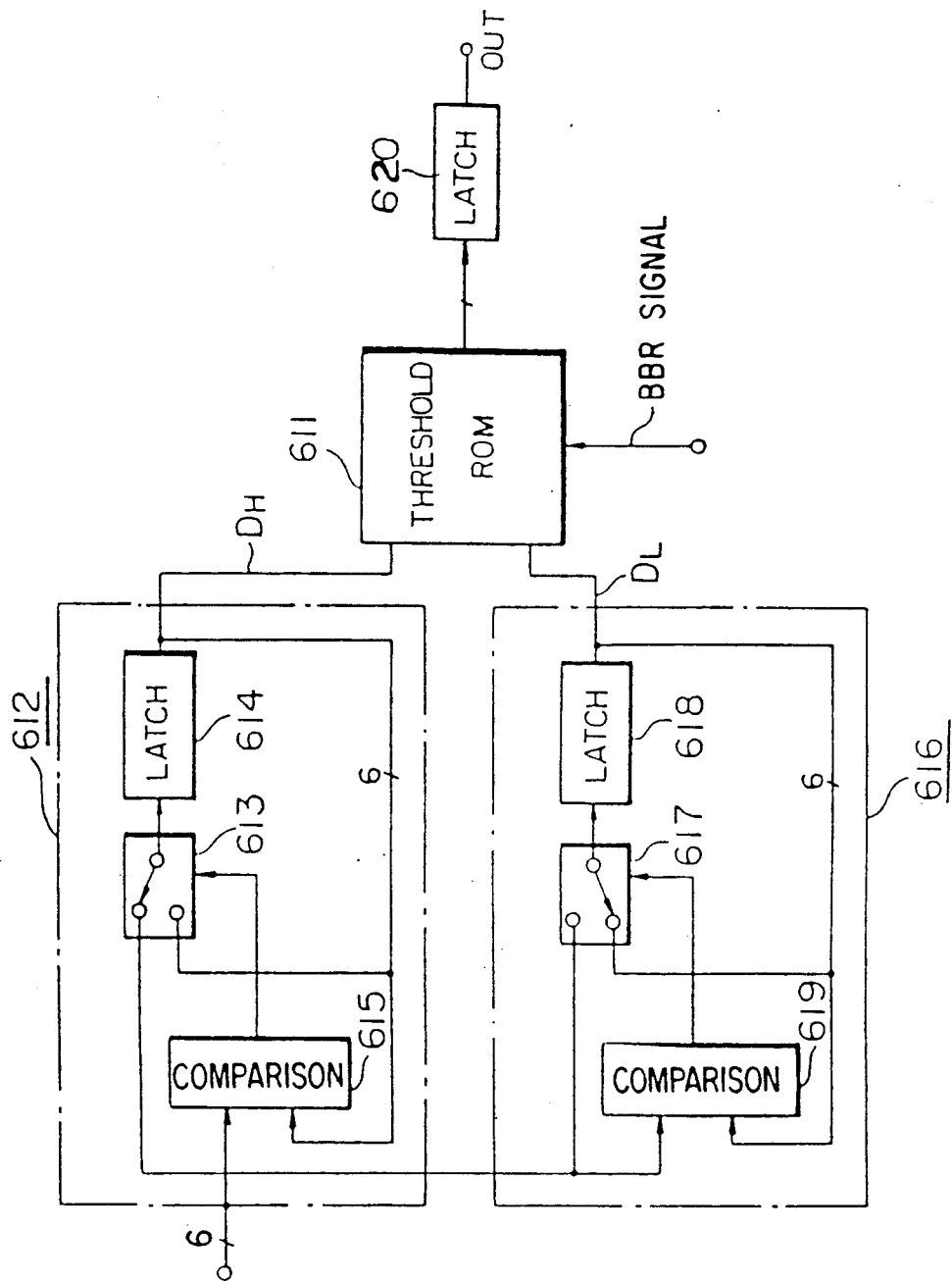
In FIG. 25, block diagram for the automatic threshold determining means is presented.
Figure 26:
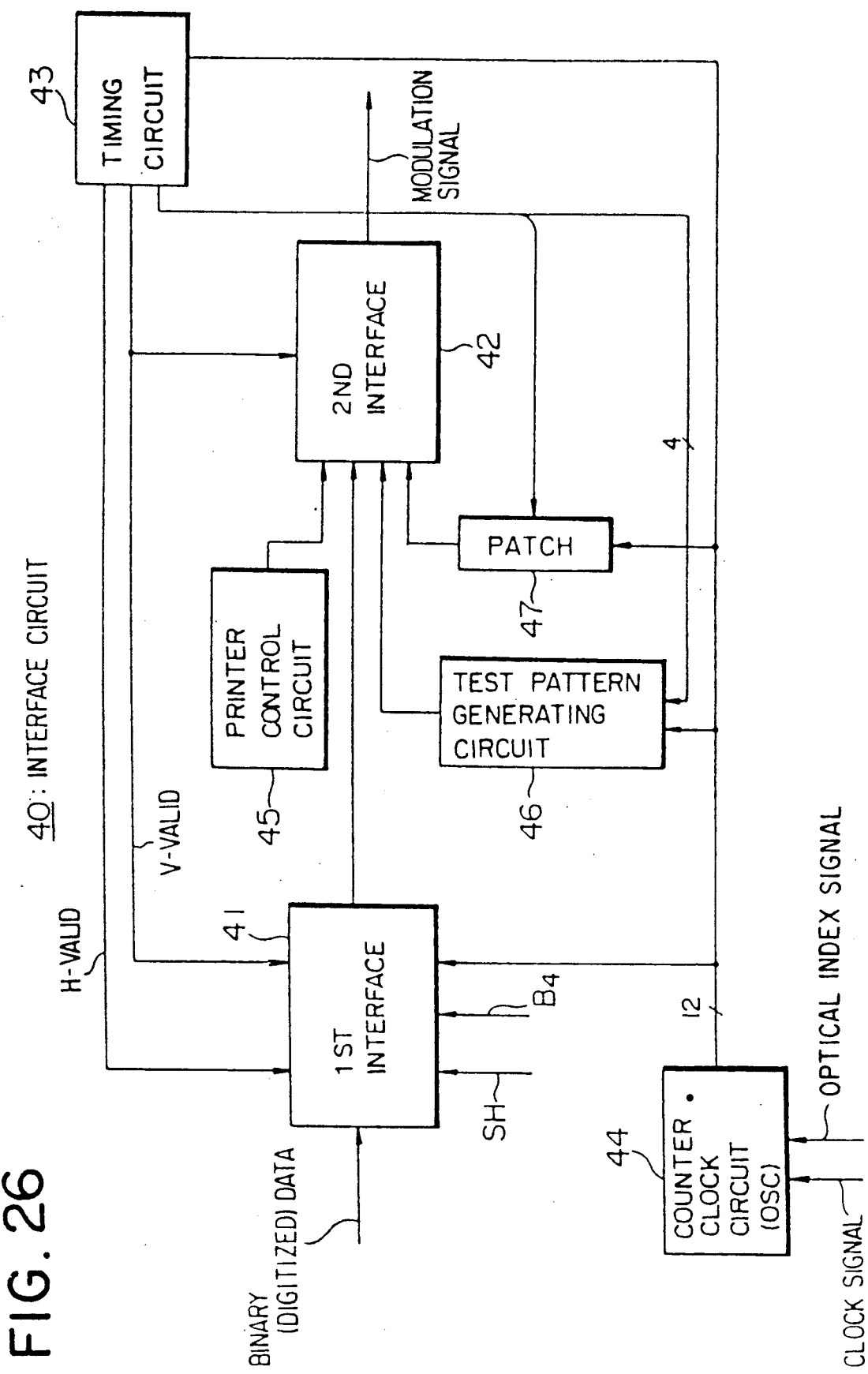
FIG. 26 is a block diagram for the overall of the interface.

FIG. 25 shows an example in which ROM is prepared to save threshold obtained for each color by the threshold calculation expression, and threshold data is selected from the maximum and minimum value of the line.

In this figure, 611 indicates the ROM which stores threshold for each color. The density data is supplied both to the maximum value calculation circuit 612 and the minimum value calculation circuit 616.

In the following example, the maximum value calculation circuit 616 is taken, since this is applies to the minimum value circuit 612.

The density data of the current pixel and that of the previous pixel latched by the latch circuit 614 is supplied to the switching circuit 613. The density data of the current pixel and that of the previous pixel are supplied to the comparator 615 for comparison, where either of them is selected as an output. If the density data of the current pixel is larger than the other, that density data is selected.

This comparison is conducted for all the pixels to find the maximum value DH.

Likewise, the minimum value calculation circuit 616 finds the minimum value DL from results of comparison of minimum values by the comparator 619.

The maximum values DH and DL obtained for one line are used to address the threshold ROM 611. Selection of the threshold for which color is conducted based on the BBR signal supplied to the threshold ROM 611.

The threshold data selected by the threshold ROM 611 is latched by the latch circuit 620, after that the threshold data is supplied to the multivaluing circuit 600B.

The threshold selection signal is supplied from the operation/indicator section to the multivaluing circuit 600B, where the threshold for EE mode or that or manual mode is selected. Normally EE mode is assumed. If EE mode is reset, the address of the threshold ROM 630, manual threshold determining mean, is assigned to output the desired threshold for coding.

To code a photo image into binary code, a digitizing matrix of 8 by 8, for example, can be prepared as a threshold ROM 630. Also, the counter output that designates a row and a column can be used to control the threshold ROM 630 address. The image data can be made ternary to represent gray color.

The binary image signal is supplied to the output unit 700 through the interface circuit 40. The following description is related to the configuration and operation of the interface circuit 40.

The interface circuit 40 consists of the first interface 41 to receive binary data and the second interface 42 to send binary data from the former interface.

To the first interface 41, the horizontal valid signal H-VALID and the vertical valid signal L-VALID are supplied along with the clock of the predetermined frequency (6 MHz, in this example) from the counter clock circuit 44.

This allows binary data to be sent synchronously with the CCD drive clock to the second interface 42, only when the horizontal and vertical valid signals are generated.

The counter clock circuit 44 generates the timing clock of the primary scanning synchronously with the optical index signal.

The second interface 42 is used to send binary data from the first interface 41 and other image data to output unit 700.

Other data include:
test pattern image data from the test pattern generating circuit 46;
patch image data from patch circuit 47; and
control data from the printer control circuit.

The test pattern image data is used during check of image processing. Patch image data for toner density detection is used during patch processing.

The test pattern generating circuit 46 and patch circuit 47 are both driven by clock from the counter clock circuit 44, whereby the timing with the binary data from the first interface 41 is taken.

The binary data from the second interface 42 is used as laser beam modulation signal, with respect to the output unit 700.

Figure 27:
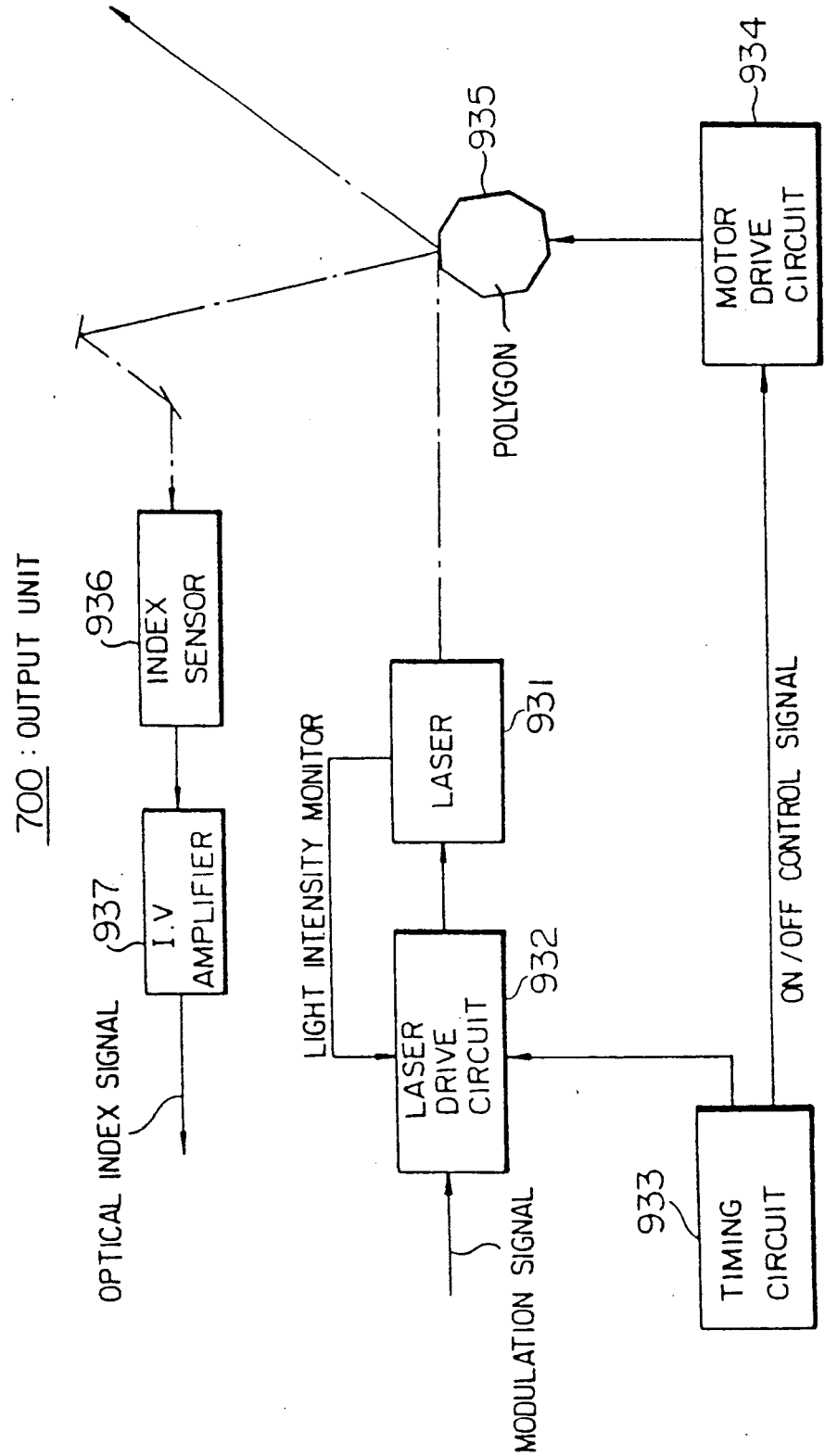
FIGS. 27 and 28 present a block diagram for the output apparatus and the laser beam scanner, respectively.

FIG. 27 shows the peripheral circuit of the output unit 700. The semiconductor laser 931 is equipped with its driving circuit to which the above binary data is supplied as a modulating signal. This signal causes laser beam to be modulated internally. The laser driving circuit 932 is controlled by the control signal from the timing circuit 933 so that laser beam is driven only in the horizontal and vertical valid sections. The signal that indicating the light intensity of laser beam is fed back to the laser driving circuit 932 so that laser is driven for a constant light intensity of beam.

The point to start the operation for laser beam deflected by the octahedron polygon 935 is detected by the index sensor 936. The conversion from the index signal to the voltage signal by the I/V amplifier; the index signal is supplied to the counter clock 44 to form the line signal SH and to control the timing for optical primary scan.

Note that 934 is a drive circuit for a polygon motor; its on/off signals are supplied to the timing circuit 933.

Figure 28:
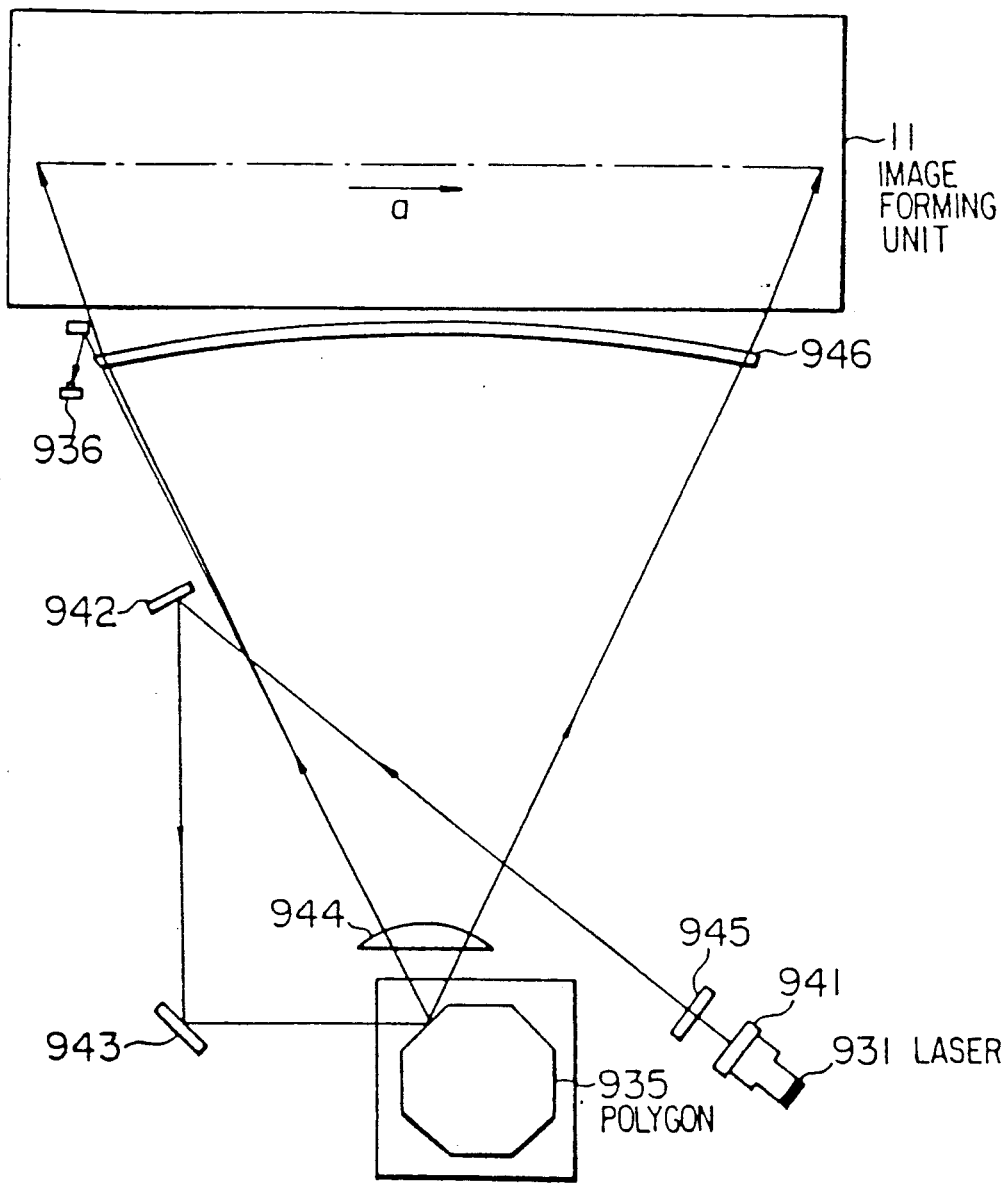

FIG. 28 shows an example which uses a laser beam scan (optical scanning unit) as an image exposure means.

The laser beam scanner 940 processes semiconductor laser 931 which is on/off-controlled according to (for example, binary data). Laser color-separated image beam from the laser 931 is entered into the polygon 935 consisting of a rotating polyhedron multi-sided mirror through the mirrors 942 and 943. The laser beam is deflected by the polygon 935, then is irradiated on the surface of image forming unit 11 through the $f-\theta$ lens 944 for image pickup.

945 and 946 are cylindrical lenses with angle of turn.

The polygon 935 allows the laser beam to scan the surface of the image forming unit 11 at a constant speed in the predetermined direction a. This scan allows image exposure corresponding to the color-separated image.

The $f-\theta$ lens 944 is used to obtain the predetermined beam diameter on the image forming unit 11.

The polygon 935 can be galvanomirror or optical quartz deflector instead of the rotating multi-sided mirror.

As mentioned above, according to the invention, since latch circuits are provided for respective image processing stage after color separation process, relative interference among every stages of various kinds of image processing and influence caused by noises coming from outside can be eliminated by this constitution.

Further, in the invention, latch treatment is applied onto color code data obtained by color separation process, thereby there is an effect in that the circuitry size is greatly reduced.

In addition, in the invention, various kinds of image processing are carried out at the stage after color separation process and before binary coding process.

This resolves the problem of an increase in circuit size that calls for higher cost of the apparatus. It also enables image processing such as color ghost correction and resolution correction, thus performing the desired image processing while maintaining picture quality, and attaining high-quality color recording.

What is claimed is:

1. An image processing apparatus for processing digital color image data, comprising:
   input means for introducing color image signals into a conversion means;
   said conversion means generating digital color image data including color data and density data;
   data processing means including a plurality of image processing circuits for processing the color data and the density data; and
   latch means provided for each of said plurality of image processing circuits so that the color data and the density data are respectively latched after every pass through said plurality of image circuits.

2. The image processing apparatus of claim 1, wherein said conversion means comprises:
   a color map for generating the digital color image data including the color data and the density data on the basis of the color image signal.

3. The image processing apparatus of claim 1, wherein said data processing means includes a color ghost corrections circuit and an image resolution correction circuit.

* * * * *